US010631335B2

(12) United States Patent
Ko et al.

(10) Patent No.: US 10,631,335 B2
(45) Date of Patent: Apr. 21, 2020

(54) WIRELESS COMMUNICATION METHOD AND WIRELESS COMMUNICATION TERMINAL USING BASIC SERVICE SET IDENTIFICATION INFORMATION DETERMINATION OF RECEIVED FRAME

(71) Applicants: WILUS INSTITUTE OF STANDARDS AND TECHNOLOGY INC., Gyeonggi-do (KR); SK TELECOM CO., LTD., Seoul (KR)

(72) Inventors: Geonjung Ko, Gyeonggi-do (KR); Juhyung Son, Gyeonggi-do (KR); Jinsam Kwak, Gyeonggi-do (KR); Woojin Ahn, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 6 days.

(21) Appl. No.: 16/141,977

(22) Filed: Sep. 26, 2018

(65) Prior Publication Data
US 2019/0029039 A1    Jan. 24, 2019

Related U.S. Application Data

(63) Continuation of application No. PCT/KR2017/003661, filed on Apr. 3, 2017.

(30) Foreign Application Priority Data

Apr. 2, 2016  (KR) .................. 10-2016-0040551
Jul. 23, 2016  (KR) .................. 10-2016-0093812
Aug. 11, 2016  (KR) .................. 10-2016-0102229

(51) Int. Cl.
*H04W 74/08* (2009.01)
*H04W 84/12* (2009.01)

(52) U.S. Cl.
CPC ........... *H04W 74/08* (2013.01); *H04W 84/12* (2013.01)

(58) Field of Classification Search
CPC ...... H04W 74/08; H04W 84/12; H04W 72/04
See application file for complete search history.

(56) References Cited

U.S. PATENT DOCUMENTS 8,971,213 B1   3/2015  Hart
10,128,966 B1  11/2018 Chu et al.
(Continued)

FOREIGN PATENT DOCUMENTS

EP   3 054 736   8/2016
EP   3 086 484   10/2016
(Continued)

OTHER PUBLICATIONS

Office Action dated Sep. 9, 2019 for Japanese Patent Application No. 2019-503179 and its English translation provided by the Applicant's foreign counsel.
(Continued)

*Primary Examiner* — Chi Ho A Lee
(74) *Attorney, Agent, or Firm* — Ladas & Parry, LLP

(57) ABSTRACT

The present invention relates to a wireless communication method and a wireless communication terminal using a determination of basic service set identification information of a received frame, and more particularly, to a wireless communication method and a wireless communication terminal for performing an operation according to a determination result whether the received frame is an intra-BSS frame or an inter-BSS frame. To this end, provided are a wireless communication terminal including a processor and a communication unit, wherein the processor receives a wireless frame through the communication unit, when the received frame is a VHT PPDU, extracts partial association
(Continued)

ID (AID) information and group ID information from a preamble of the VHT PPDU, when the extracted group ID information is equal to a predetermined value, checks whether at least some information of the extracted partial AID matches a partial basic service set (BSS) color announced to the terminal, and determines whether the received frame is an intra-BSS frame or an inter-BSS frame according to whether at least some information of the partial AID matches the partial BSS color and a wireless communication method using the same.

16 Claims, 18 Drawing Sheets

(56) References Cited

U.S. PATENT DOCUMENTS

| | | | |
|---|---|---|---|
| 2015/0282043 A1 | 10/2015 | Fang et al. | |
| 2016/0088126 A1 | 3/2016 | Doan et al. | |
| 2016/0353275 A1* | 12/2016 | Liu | H04W 8/26 |
| 2017/0006541 A1* | 1/2017 | Huang | H04W 74/006 |
| 2017/0164371 A1* | 6/2017 | Kim | H04W 74/0816 |
| 2017/0188376 A1* | 6/2017 | Noh | H04W 72/085 |
| 2017/0230981 A1* | 8/2017 | Ryu | H04W 74/08 |
| 2017/0289819 A1* | 10/2017 | Kim | H04W 16/14 |
| 2017/0295560 A1* | 10/2017 | Kim | H04W 84/12 |
| 2018/0014327 A1* | 1/2018 | Park | H04L 69/323 |
| 2018/0146426 A1* | 5/2018 | Park | H04W 74/002 |
| 2018/0220456 A1 | 8/2018 | Kim et al. | |
| 2018/0227952 A1 | 8/2018 | Kim et al. | |
| 2018/0317170 A1 | 11/2018 | Cariou | |
| 2018/0317173 A1* | 11/2018 | Kim | H04W 52/02 |
| 2018/0359807 A1* | 12/2018 | Kim | H04W 84/12 |
| 2019/0261419 A1* | 8/2019 | Noh | H04W 8/26 |
| 2019/0327741 A1* | 10/2019 | Li | H04W 72/0453 |

FOREIGN PATENT DOCUMENTS

| | | |
|---|---|---|
| KR | 10-2016-0006681 | 1/2016 |
| WO | 2015/050311 | 4/2015 |
| WO | 2015/093704 | 6/2015 |
| WO | 2015/112780 | 7/2015 |
| WO | 2015/120488 | 8/2015 |
| WO | 2016/003056 | 1/2016 |
| WO | 2016/029876 | 3/2016 |
| WO | 2016/036138 | 3/2016 |
| WO | 2017/171530 | 10/2017 |
| WO | 2017/171531 | 10/2017 |

OTHER PUBLICATIONS

Extended European Search Report dated Oct. 17, 2019 for EP Patent Application No. 17775954.5.
International Preliminary Report on Patentability (Chapter I) dated Oct. 2, 2018 for PCT/KR2017/003661 and its English translation from WIPO.
International Preliminary Report on Patentability (Chapter I) dated Oct. 2, 2018 for PCT/KR2017/003662 and its English translation from WIPO.
Robert Stacey, "Specification Framework for TGax", IEEE P802.11 Wireless LANs, IEEE 802.11-15/0132r15, Mar. 17, 2016, pp. 1-49.
Jianhan Liu, Mediatek, et al., "AID Assign Rule Based on BSS Color and HE Operation Element", IEEE 802.11-16/0364r0, Mar. 11, 2016, pp. 1-19.
Jianhan Liu, Mediatek, et al., "AID Assign Rule Based on BSS Color and HE Operation Element", IEEE 802.11-16/0364r1, Mar. 11, 2016, pp. 1-19.
Jianhan Liu, Mediatek, et al., "AID Assign Rule Based on BSS Color and HE Operation Element", IEEE 802.11-16/0364r2, Mar. 11, 2016, pp. 1-19.
Jianhan Liu, Mediatek, et al., "AID Assign Rule Based on BSS Color and HE Operation Element", IEEE 802.11-16/0364r3, Mar. 11, 2016, pp. 1-19.
Jianhan Liu, Mediatek Inc., et al., "Spec Text for HE Operation element and AID Assign Rule", IEEE P802.11 Wireless LANs, IEEE 802.11-16/0884r0, Jul. 10, 2016, pp. 1-3.
Jianhan Liu, Mediatek Inc., et al., "Spec Text for HE Operation element and AID Assign Rule", IEEE P802.11 Wireless LANs, IEEE 802.11-16/0884r1, Jul. 10, 2016, pp. 1-3.
Jianhan Liu, Mediatek Inc., et al., "Spec Text for HE Operation element and AID Assign Rule", IEEE P802.11 Wireless LANs, IEEE 802.11-16/0884r5, Sep. 12, 2016, pp. 1-3.
Geonjung KO et al., Wilus, "Discussions on Partial BSS Color", IEEE 802.11-16/0918r0, slides 1-9.
Geonjung KO, Wilus, et al., "Discussions on Partial BSS Color", IEEE 802.11-16/0918r1, slides 1-14.
Geonjung KO, Wilus, et al., "Text for Partial BSS Color and AID Assignment Rule", IEEE P802.11 Wireless LANs, IEEE 802.11-16/1236r0, Sep. 12, 2016, pp. 1-3.
International Search Report for PCT/KR2017/003661 dated Jul. 13, 2017 and its English translation from WIPO (published as WO 2017/171530).
Written Opinion of the International Searching Authority for PCT/KR2017/003661 dated Jul. 13, 2017 and its English machine translation by Google Translate (published as WO 2017/171530).
International Search Report for PCT/KR2017/003662 dated Jun. 30, 2017 and its English translation from WIPO (published as WO 2017/171531).
Written Opinion of the International Searching Authority for PCT/KR2017/003662 dated Jun. 30, 2017 and its English machine translation by Google Translate (published as WO 2017/171531).
Huawei et al., "Discussions on Spatial Reuse Operations in 11ax", doc.: IEEE 802.11/0382r0, slides 1-18, Mar. 14, 2016, see slide 12, 15.
Wilus, "Issues on BSS Color Bits Collision", doc.: IEEE 802.11-16/0396r0. see slides 1-18, Mar. 14, 2016, see slide 6.
Notice of Allowance dated Dec. 11, 2019 for U.S. Appl. No. 16/141,973.
Notice of Allowance dated Feb. 3, 2020 for Japanese Patent Application No. 2019-503179 and its English translation provided by the Applicant's foreign counsel.

* cited by examiner

| Condition | Group ID | Partial AID |
|---|---|---|
| Addressed to AP | 0 | BSSID[39:47] |
| Addressed to Mesh STA | 0 | RA[39:47] |
| Sent by an AP and addressed to a STA associated with that AP or sent by a DLS or TDLS STA in a direct path to a DLS or TDLS peer STA | 63 | (dec(AID[0:8]) + dec(BSSID[44:47] XOR BSSID[40:43])) * 2^5) mod 2^9 |
| Otherwise | 63 | 0 |

FIG. 8

(a) AID[0:8]    B8 B7 B6 B5 B4 B3 B2 B1 B0

+

(b) bin(dec(BSSID[44:47] XOR BSSID[40:43]) * 2^5)    B8 B7 B6 B5 B4 B3 B2 B1 B0
                                                                    ‾‾‾‾‾‾‾‾‾‾‾‾‾‾ 00000

*FIG. 10*

(a) PAID calculation

N-bit assigned by the rule x  B8 B7 B6 B5 B4 B3 B2 B1 B0

+ y        B8 B7 B6 B5 B4 B3 B2 B1 B0  } 00000 due to $*2^5$ mod $2^9$
(Cutting off B9)

z → PAID

Partial BSS color (N-bit)
- Higher N bits of x only depend on the BSS.
- y only depends on the BSS.

(b) PAID for DL

$$\text{PAID} = \underbrace{(dec(\text{AID}[0:8]) + dec(\text{BSSID}[44:47] \text{ XOR BSSID}[40:43]) * 2^5)}_{y} \text{ mod } 2^9$$

(c) AID assignment rule

$$\text{AID}[8-N+1:8] = bin((dec(\text{BCB}[0:N-1]) + dec(\text{BSSID}[47-N+1:47] \text{ XOR BSSID}[43-N+1:43])) \text{ mod } 2^N:N])$$

*FIG. 11*

(a)
```
if PAID – y' < 0          // Case Rx1
   x' = PAID – y' +2^9 else       // PAID – y' >= 0, Case Rx2
   x' = PAID – y'
```

(b)
```
if (x+y) >= 2^9          // Case Tx1
   PAID = x + y – 2^9 else       // (x+y) < 2^9, Case Tx2
   PAID = x + y
```

*FIG. 14*

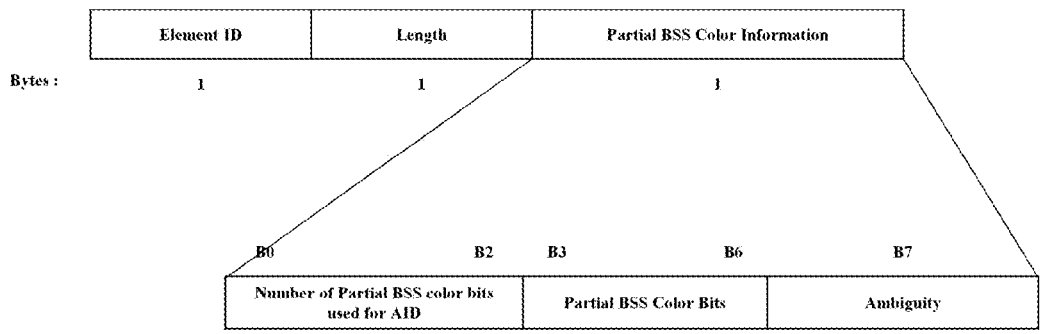

FIG. 15

| Number of Partial BSS color bits used for AID | Description |
|---|---|
| 0 | Not using partial BSS color |
| 1 | Using 1-bit of partial BSS color without ambiguity |
| 2 | Using 2-bit of partial BSS color without ambiguity |
| 3 | Using 3-bit of partial BSS color without ambiguity |
| 4 | Using 4-bit of partial BSS color without ambiguity |
| 5 | Using 1-bit of partial BSS color with ambiguity |
| 6 | Using 2-bit of partial BSS color with ambiguity |
| 7 | Using 3-bit of partial BSS color with ambiguity |

FIG. 16

(a) - AID assign rule $$AID(8-N+1:8) = bin[(dec(BCB(0:N-1)) + dec(BSSID(47-N+1:47)\ XOR\ BSSID(43-N+1:43)))\ mod\ 2^{\wedge}N,\ N]$$
where $N = 4$ (b)

- AID assign rule if $(dec(BCB[0:N-1]) - dec(BSSID[47-N+1:47]$ XOR $BSSID[43-N+1:43])) < 0$
    $AID[8-N+1:8] = bin[(2^N + dec(BCB[0:N-1]) - dec(BSSID[47-N+1:47]$ XOR $BSSID[43-N+1:43])), N]$ else    // $(dec(BCB[0:N-1]) - dec(BSSID[47-N+1:47]$ XOR $BSSID[43-N+1:43])) >= 0$
    $AID[8-N+1:8] = bin[(dec(BCB[0:N-1]) - dec(BSSID[47-N+1:47]$ XOR $BSSID[43-N+1:43])), N]$

*FIG. 18*

- AID assign rule $AID[5:5+N-1] = bin[(dec(BCB[0:N-1]) + dec(BSSID[44:44+N-1]$ XOR $BSSID[40:40+N-1])) \bmod 2^N, N]$

*FIG. 19*

- AID assign rule $AID[5:5+N-1] = bin[(dec(BCB[0:N-1]) - dec(BSSID[44:44+N-1]$ XOR $BSSID[40:40+N-1])) \bmod 2^N, N]$

*FIG. 20*

- AID assign rule if $(dec(BCB[0:N-1]) - dec(BSSID[44:44+N-1]\text{ XOR }BSSID[40:40+N-1])) < 0$
    $AID[5:5+N-1] = bin[(2^N + dec(BCB[0:N-1]) - dec(BSSID[44:44+N-1]\text{ XOR }BSSID[40:40+N-1])), N]$ else    // $(dec(BCB[0:N-1]) - dec(BSSID[44:44+N-1]\text{ XOR }BSSID[40:40+N-1])) >= 0$
    $AID[5:5+N-1] = bin[(dec(BCB[0:N-1]) - dec(BSSID[44:44+N-1]\text{ XOR }BSSID[40:40+N-1])), N]$

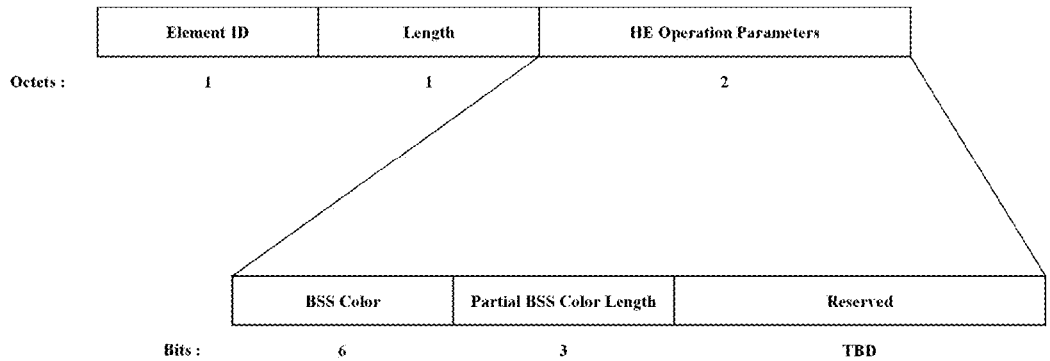
FIG. 23
- AID assign rule
AID(8−N+1:8) = bin[(dec(BCB(0:N−1)) − dec(BSSID(47−N+1:47) XOR BSSID(43−N+1:43))) mod 2^N, N]
where N = 4
FIG. 24
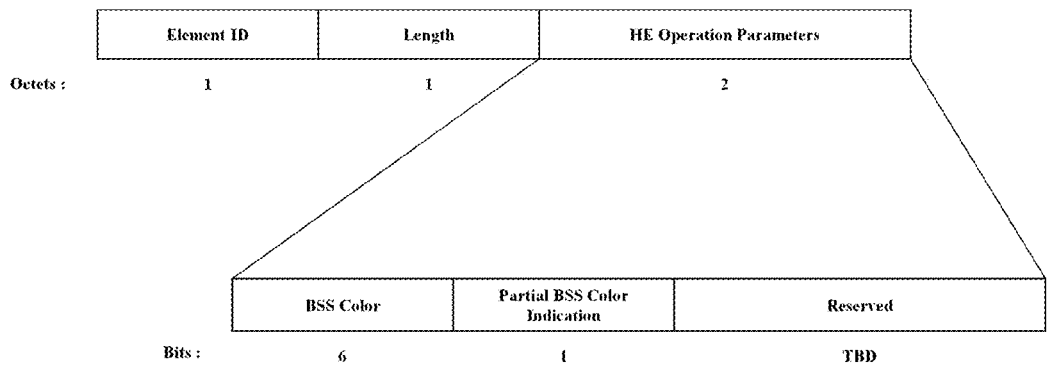
FIG. 25

- AID assign rule (N != 4)

(a) $AID[5:8] = bin[(dec(BCB[0:N-1]) * 2^{4-N} + dec(A[0:3-N]) - dec(BSSID[44:47] \text{ XOR } BSSID[40:43])) \mod 2^4, 4]$
where $A$ is an arbitrary binary number

- AID assign rule (N == 4)

(b) $AID[5:8] = bin[(dec(BCB[0:3]) - dec(BSSID[44:47] \text{ XOR } BSSID[40:43])) \mod 2^4, 4]$

WIRELESS COMMUNICATION METHOD AND WIRELESS COMMUNICATION TERMINAL USING BASIC SERVICE SET IDENTIFICATION INFORMATION DETERMINATION OF RECEIVED FRAME

CROSS-REFERENCE TO RELATED APPLICATIONS

This application is a continuation of International Patent Application No. PCT/KR2017/003661 filed on Apr. 3, 2017, which claims the priority to Korean Patent Application No. 10-2016-0040551 filed in the Korean Intellectual Property Office on Apr. 2, 2016, Korean Patent Application No. 10-2016-0093812 filed in the Korean Intellectual Property Office on Jul. 23, 2016, and Korean Patent Application No. 10-2016-0102229 filed in the Korean Intellectual Property Office on Aug. 11, 2016, the entire contents of which are incorporated herein by reference.

TECHNICAL FIELD

The present invention relates to a wireless communication method and a wireless communication terminal using a determination of basic service set identification information of a received frame, and more particularly, to a wireless communication method and a wireless communication terminal for performing an operation according to a determination result whether the received frame is an intra-BSS frame or an inter-BSS frame.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention has an object to provide high-efficiency/high-performance wireless LAN communication in a high-density environment as described above.

In addition, the present invention has an object to set a rule for AID assignment of STAs in a BSS.

In addition, the present invention has an object to prevent ambiguity that may occur in intra/inter-BSS determination using partial AID information of a VHT PPDU.

Technical Solution

In order to achieve the objects, the present invention provides a wireless communication method and a wireless communication terminal as below.

First, an exemplary embodiment of the present invention provides a base wireless communication terminal, the terminal including: a processor; and a communication unit, wherein the processor assigns an association ID (AID) to at least one terminal associated with the base wireless communication terminal, wherein predetermined N-bit(s) of the AID is determined based on a value obtained by subtracting an N-bit value based on a BSSID from a partial BSS color value.

In addition, an exemplary embodiment of the present invention provides a wireless communication method of a base wireless communication terminal, including: assigning an association ID (AID) to at least one terminal associated with the base wireless communication terminal; and transmitting the assigned AID information to a terminal associated with the base wireless communication terminal, wherein predetermined N-bit(s) of the AID is determined based on a value obtained by subtracting an N-bit value based on a BSSID from a partial BSS color value.

The partial BSS color value may be a value of the least significant N-bit(s) or the most significant N-bit(s) of the BSS color, and the N-bit value based on the BSSID may be a value of exclusive OR of a first predetermined N-bit(s) of the BSSID and a second predetermined N-bit(s) of the BSSID.

According to an embodiment of the present invention, the N is 4.

According to an embodiment of the present invention, the AID is determined by the following equation.

$$AID(8-N+1:8)=\text{bin}[(dec(BCB(0:N-1))-dec(BSSID(47-N+1:47) \text{ XOR } BSSID(43-N+1:43))) \bmod 2^N,N]$$

Herein, the BCB is a BSS color, the BSSID is a BSS identifier, and N=4.

When the base wireless communication terminal transmits a VHT PPDU to a first terminal, the processor may set a partial AID using AID information of the first terminal determined by the subtracting operation and a K-bit value based on the BSSID, and may transmit the set partial AID information by containing it into a preamble of the VHT PPDU.

Predetermined N-bit(s) of the partial AID may represent the partial BSS color value where the N-bit value based on the BSSID is offset by a K-bit value based on the BSSID.

The partial AID information may be contained in a VHT-SIG-A of the VHT PPDU.

Next, another exemplary embodiment of the present invention provides a wireless communication terminal, the terminal including: a processor; and a communication unit, wherein the processor receives a wireless frame through the communication unit, when the received frame is a VHT PPDU, extracts partial association ID (AID) information and group ID information from a preamble of the VHT PPDU, when the extracted group ID information is equal to a predetermined value, checks whether at least some information of the extracted partial AID matches a partial basic service set (BSS) color announced to the terminal, and determines whether the received frame is an intra-BSS frame or an inter-BSS frame according to whether at least some information of the partial AID matches the partial BSS color.

In addition, another exemplary embodiment of the present invention provides a wireless communication method of a wireless communication terminal, including: receiving a wireless frame through the communication unit; when the received frame is a VHT PPDU, extracting partial association ID (AID) information and group ID information from a preamble of the VHT PPDU; when the extracted group ID information is equal to a predetermined value, checking whether at least some information of the extracted partial AID matches a partial basic service set (BSS) color announced to the terminal; and determining whether the received frame is an intra-BSS frame or an inter-BSS frame according to whether at least some information of the partial AID matches the partial BSS color.

The partial AID may be determined using an AID assigned to an intended recipient of the VHT PPDU and a K-bit value based on a BSSID of a BSS with which the recipient is associated, and when a BSS to which the terminal belongs applies an AID assignment rule in which partial BSS color bits are used, predetermined N-bit(s) of an AID assigned in the BSS to which the terminal belongs may be determined by using a partial BSS color value announced to the terminal and an N-bit value based on a BSSID of the BSS to which the terminal belongs, and the N may be equal to K.

The predetermined N-bit(s) of the AID assigned in the BSS to which the terminal belongs may be determined based on a value obtained by subtracting the N-bit value based on the BSSID of the BSS to which the terminal belongs from the partial BSS color value announced to the terminal.

When a BSS to which the recipient belongs applies the AID assignment rule in which partial BSS color bits are used, the predetermined bit(s) of the partial AID may represent a partial BSS color value announced to the recipient where the K-bit value based on the BSSID is offset by the N-bit value based on a BSSID of a BSS with which the recipient is associated.

The partial BSS color value may be a value of the least significant N-bit(s) or the most significant N-bit(s) of the BSS color, and the N-bit value based on the BSSID may be a value of exclusive OR of a first predetermined N-bit(s) of the BSSID and a second predetermined N-bit(s) of the BSSID.

According to an embodiment of the present invention, the N is 4.

According to an embodiment of the present invention, the AID is determined by the following equation.

$$AID(8-N+1:8)=\text{bin}[(dec(BCB(0:N-1))-dec(BSSID(47-N+1:47) \text{ XOR } BSSID(43-N+1:43))) \bmod 2^N,N]$$

Herein, the BCB is a BSS color, the BSSID is a BSS identifier, and N=4.

The predetermined value of the group ID information may indicate that the frame is a downlink frame.

The processor may perform a first operation when the received frame is determined as an intra-BSS frame, and the processor may perform a second operation when the received frame is determined as an inter-BSS frame.

The processor may determine whether the channel is busy based on a first CCA threshold value when the received frame is determined as an intra-BSS frame, and the processor may determine whether the channel is busy based on both the first CCA threshold value and a second CCA threshold value distinct from the first CCA threshold value when the received frame is determined as an inter-BSS frame.

The second CCA threshold value may have a value equal to or higher than the first CCA threshold value.

The processor may set or update a first network allocation vector (NAV) when the received frame is determined as an intra-BSS frame, and the processor may set or update a second NAV when the received frame is determined as an inter-BSS frame.

Advantageous Effects

According to an embodiment of the present invention, at least some information of the partial AID of the VHT PPDU may indicate a partial BSS color value, so that efficient intra/inter-BSS frame determination can be performed.

More specifically, according to an embodiment of the present invention, a terminal receiving a VHT PPDU can perform determination of an intra-BSS frame and an inter-BSS frame using partial AID information without obtaining additional information or performing additional calculation.

In addition, according to an embodiment of the present invention, if the received frame is determined as an inter-BSS frame, the spatial reuse operation can be performed thereby efficiently using wireless resources.

According to an embodiment of the present invention, it is possible to increase the total resource utilization rate in the contention-based channel access system and improve the performance of the wireless LAN system.

DESCRIPTION OF DRAWINGS

FIG. 8 is a table showing a method of setting a group ID and a partial AID according to an embodiment of the present invention.

FIG. 10 illustrates a partial AID calculation process according to an embodiment of the present invention.

FIG. 11 illustrates the partial AID calculation process in more detail according to an embodiment of the present invention.

FIG. 14 illustrates a process of calculating a reference value and a process of calculating a partial AID for intra/inter-BSS frame determination according to an embodiment of the present invention.

FIG. 15 illustrates a non-legacy element format according to another embodiment of the present invention.

FIG. 16 illustrates a method of signaling information of the number of partial BSS color bits and ambiguity information according to another embodiment of the present invention.

FIG. 18 illustrates the third embodiment of an AID assignment method according to the present invention.

FIG. 19 illustrates the fourth embodiment of an AID assignment method according to the present invention.

FIGS. 20 and 21 illustrate the fifth embodiment of an AID assignment method according to the present invention.

FIG. 22 illustrates the third embodiment of a method of determining an intra-BSS frame and an inter-BSS frame according to the present invention.

FIG. 23 illustrates a non-legacy element format according to yet another embodiment of the present invention.

FIG. 24 illustrates the sixth embodiment of an AID assignment method according to the present invention.

FIG. 25 illustrates a non-legacy element format according to still another embodiment of the present invention.

DETAILED DESCRIPTION OF THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2016-0040551, 10-2016-0093812 and 10-2016-0102229 filed in the Korean Intellectual Property Office and the embodiments and mentioned items described in the respective application, which forms the basis of the priority, shall be included in the Detailed Description of the present application.

Figure 1:
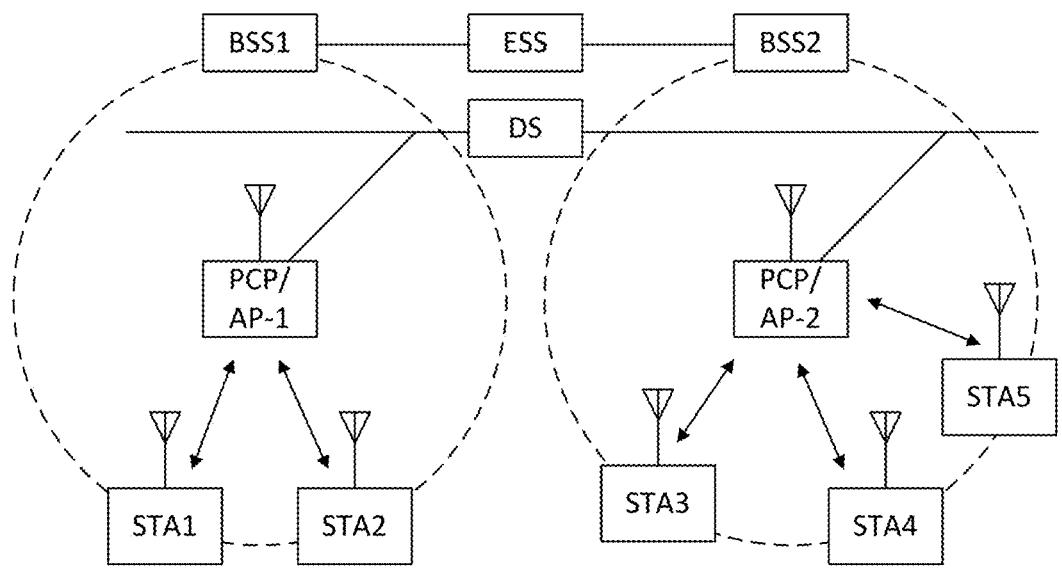
FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
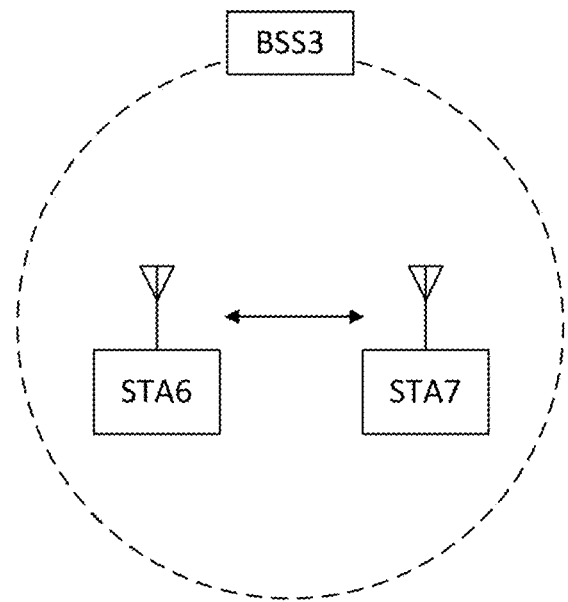
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
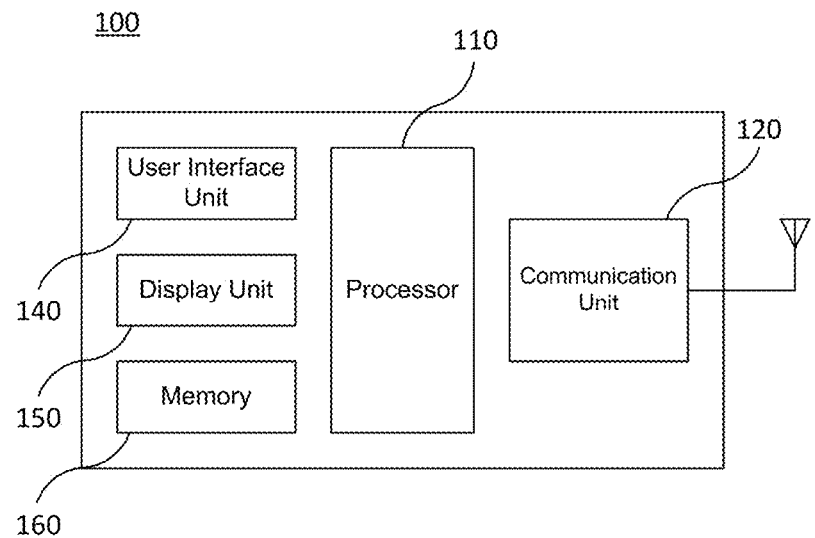
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, and 60 GHz. According to an embodiment, the station 100 may include a communication module using a frequency band of 6 GHz or more and a communication module using a frequency band of 6 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
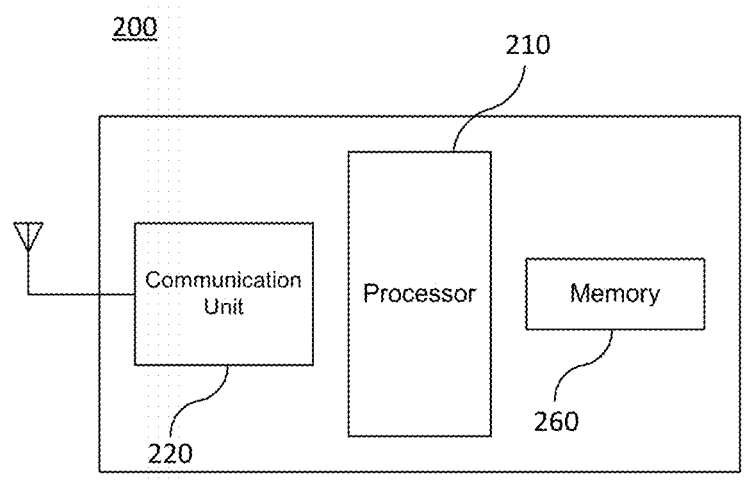
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, and 60 GHz together. Preferably, the AP 200 may include a communication module using a frequency band of 6 GHz or more and a communication module using a frequency band of 6 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
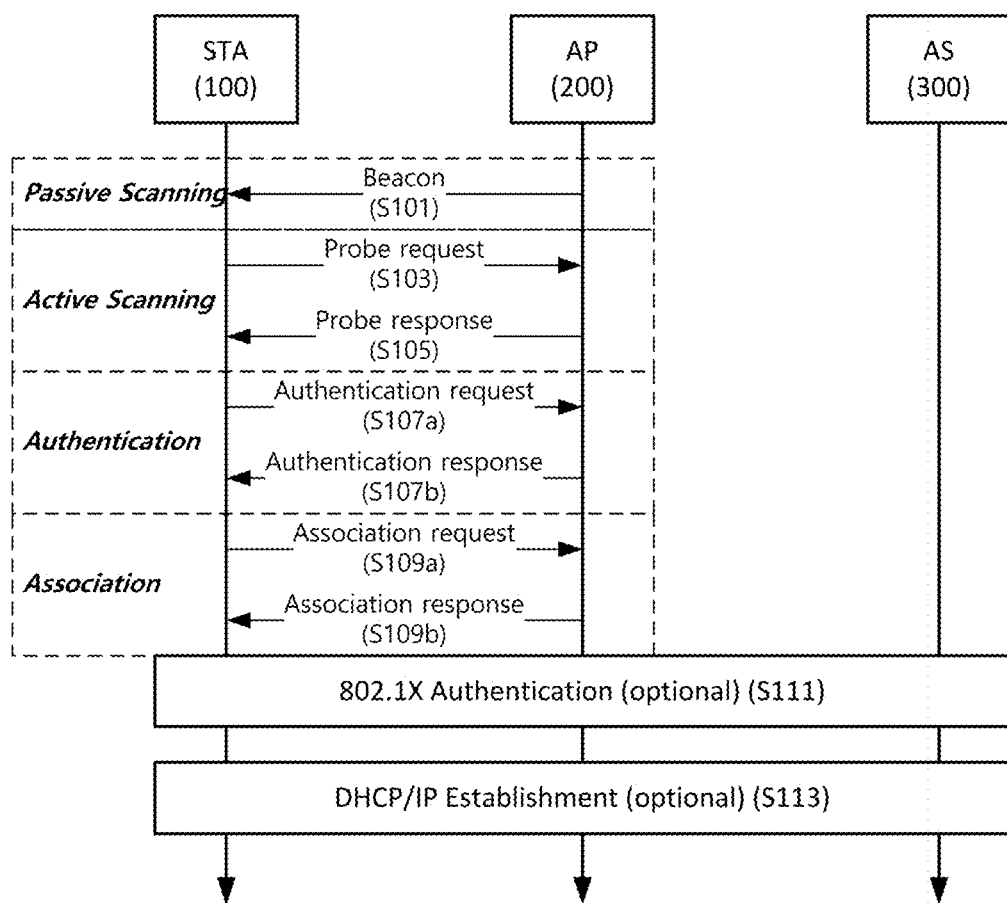
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
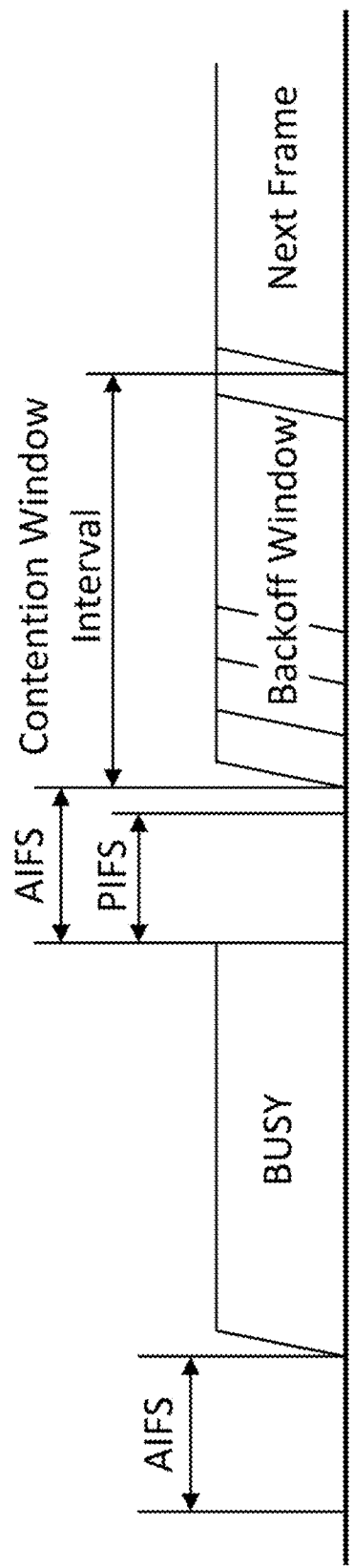
FIG. 6 illustrates a carrier sense multiple access (CSMA)/collision avoidance (CA) method used in wireless LAN communication.

FIG. 6 illustrates a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Figure 7:
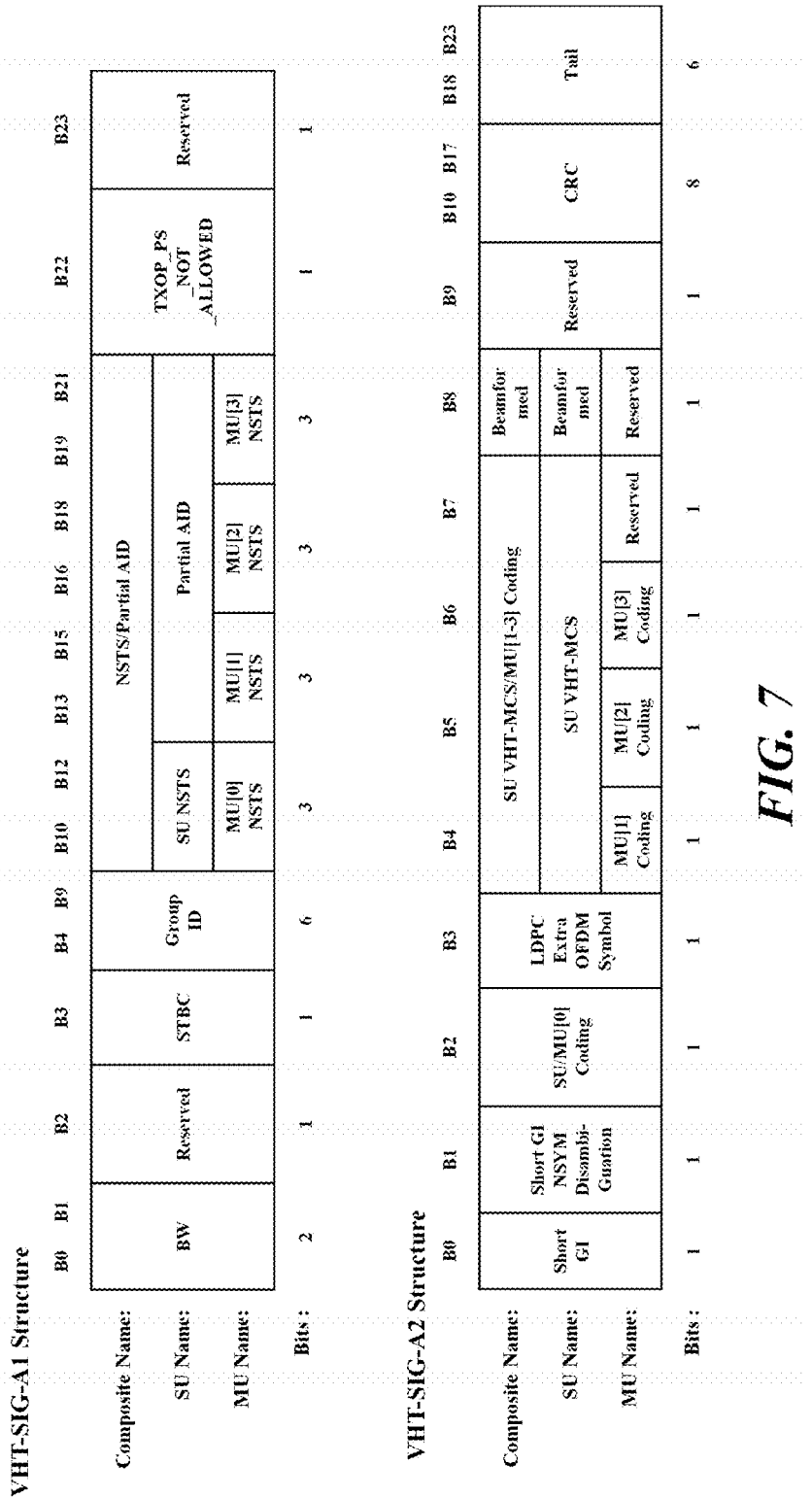
FIG. 7 illustrates configurations of VHT-SIG-A1 and VHT-SIG-A2 according to an embodiment of the present invention.

FIG. 7 illustrates configurations of VHT-SIG-A1 and VHT-SIG-A2 according to an embodiment of the present invention. The preamble of a VHT PHY protocol data unit (PPDU) includes a VHT-SIG-A field and the VHT-SIG-A consists of VHT-SIG-A1 and VHT-SIG-A2. VHT-SIG-A1 and VHT-SIG-A2 carry information necessary to interpret the VHT PPDU.

Referring to FIG. 7, VHT-SIG-A1 of a single-user PPDU may include a partial association ID (AID) field composed of 9 bits. The partial AID field may represent abbreviated information regarding the intended recipient of the corresponding PHY service data unit (PSDU). A group ID field of the VHT-SIG-A1 is set to 0 or 63 in case of the SU PPDU and to other values in case of a multi-user (MU) PPDU. The terminal may check the partial AID (or the partial AID and the group ID) of the received VHT PPDU and stop decoding if the intended recipient of the PPDU is not the terminal.

Hereinafter, methods of setting partial AID and AID according to the embodiment of the present invention will be described with reference to each drawing. For a convenience of the explanation, each equation and symbol are defined as follows. According to the embodiment of the present invention, 'H' and '0' in each equation can be substituted for each other and have the same meaning.

A[b:c] denotes bits from bit b to bit c of 'A'. According to an embodiment of the present invention, the first bit of 'A' may be bit 0, and A[b:c] may represent (b+1)-th bit to (c+1)-th bit of 'A'.

dec(A[b:c]) denotes a value of bit b to bit c of 'A' expressed by a decimal number. In this case, the value of bit b of 'A' is scaled by $2^0$ and the value of bit c of 'A' is scaled by $2^{(c-b)}$. dec(A[b:c]) and A[b:c] differ only in the expression type of information and represent substantially the same value.

bin[x, N] denotes a value of 'x' expressed by a binary number of N bits.

B(X) denotes the bit at bit position X.

XOR indicates bitwise exclusive OR.

A mod X denotes the result of modulo X operation of 'A'. According to the embodiment of the present invention, even if A is negative, the result of A mod X is positive. For example, 5 mod 3 is 2, and −5 mod 3 is 1.

FIG. 8 is a table showing a method of setting a group ID and a partial AID according to an embodiment of the present invention.

First, in a PPDU or PSDU addressed to an AP, the group ID is set to 0 and the partial AID is set to BSSID[39:47]. The BSSID indicates an identifier of a BSS to which a terminal transmitting the corresponding PPDU or PSDU belongs. Since partial information of the BSSID is set as the partial AID of an uplink frame, the partial AID of the uplink frame can have a BSS identification capability.

Next, in a PPDU or PSDU addressed to a mesh STA, the group ID is set to 0 and the partial AID is set to RA[39:47]. The RA indicates a recipient address of the corresponding PPDU or PSDU.

According to the embodiment of the present invention, in a PPDU or PSDU which meets the following condition(s), the group ID may be set to 63 and the partial AID (hereinafter, PAID) may be set as shown in Equation 1 below. i) a PPDU or PSDU (i.e., a downlink frame) transmitted by an AP and addressed to a STA associated with that AP. ii) a PPDU or PSDU transmitted by a direct link setup (DLS) STA or tunneled direct link setup (TDLS) STA in a direct path to a DLS or TDLS peer STA $$\text{PAID} = (dec(\text{AID}[0:8]) + dec(\text{BSSID}[44:47] \text{ XOR } \text{BSSID}[40:43]) * 2^5) \bmod 2^9 \quad [\text{Equation 1}]$$

That is, the PAID is determined by a combination of AID information and BSSID information. More specifically, the PAID is determined based on a value obtained by adding an exclusive OR of some bits of the BSSID to a value of some bits of the AID. In the process of summing up the AID information and the BSSID information, according to the AID setting rule, the PAID of a downlink frame may lose the BSS identification capability for a STA other than the intended recipient. Meanwhile, the group ID is set to 63 and the partial AID is set to 0 in the cases other than the above listed conditions.

The group ID information and the PAID information set in this manner may be contained in the VHT-SIG of the VHT PPDU. The AP transmitting the VHT PPDU determines the PAID information and the BSSID information, and transmits the PAID information by containing it into the VHT-SIG. In this case, the AID information indicates a value of some bits of an AID assigned to the intended recipient of the corresponding PPDU. Further, the BSSID information indicates a value based on a BSSID of the BSS to which the AP transmitting the PPDU and the recipient of the PPDU belong. The value based on the BSSID indicates the exclusive OR of some bits of the BSSID. More specifically, the value based on the BSSID indicates the exclusive OR of the first predetermined K-bit(s) of the BSSID and the second predetermined K-bit(s) of the BSSID. As in the embodiment of Equation 1, K may be set to 4, the first predetermined K-bit may indicate bits from bit 44 to bit 47, and the second predetermined K-bit may indicate bits from bit 40 to bit 43. Hereinafter, in the embodiment of the present invention, a value based on the BSSID used for setting the PAID will be referred to as a 'K-bit value based on the BSSID'. On the other hand, since the PAID is determined depending on the AID, it can be determined to be a different value according to the AID assignment method.

When the AP transmits a VHT PPDU to a STA, the AP sets the PAID using the AID information of the STA and the K-bit value based on the BSSID. In this case, the AID of the STA may be set by any one of the embodiments of the present invention described below. The AP contains the set PAID information into the preamble of the VHT PPDU and transmits it. In this case, the PAID information may be contained in the VHT-SIG-A of the VHT PPDU.

Hereinafter, an AID assignment method according to various embodiments of the present invention will be described with reference to the drawings and equations. The AP may assign an AID to each STA using at least one of the embodiments described below. According to an embodiment, the AP may assign an AID determined via the following rules to a VHT STA. In addition, the AP may transmit the assigned AID information to a terminal associated with the AP. In each embodiment, duplicative descriptions of parts which are the same as or correspond to the previous embodiment will be omitted.

Equation 2 shows the first embodiment of an AID assignment method according to the present invention.

$$AID(8-N+1:8)=\text{bin}[(dec(BCB(0:N-1))+dec(BSSID(47-N+1:47) \text{ XOR } BSSID(43-N+1:43))) \mod 2^N, N] \quad \text{[Equation 2]}$$

Herein, N is any integer between 1 and 4.

According to an embodiment of the present invention, the bits from bit 8−N+1 to bit 8 of the AID may be set by the rule of Equation 2. In this case, the BCB indicates a partial BSS color or a BSS color. The partial BSS color is announced to STAs associated to the BSS by the AP operating the BSS. According to the embodiment of Equation 2, the predetermined N-bit(s) of the AID may be determined using the BCB information and the BSSID information. The BCB information is a partial BSS color value and represents the value of the least significant N-bit(s) of the BSS color. However, the present invention is not limited thereto, and the BCB information may represent the value of the most significant N-bit(s) of the BSS color. The BSSID information represents a value based on the BSSID of the BSS operated by the AP that assigns the AID. The value based on the BSSID represents the exclusive OR of some bits of the BSSID. More specifically, the value based on the BSSID indicates the exclusive OR of the first predetermined N-bit(s) of the BSSID and the second predetermined N-bit(s) of the BSSID. According to the embodiment of Equation 2, the first predetermined N-bit(s) indicate bit(s) from bit 47−N+1 to bit 47, and the second predetermined N-bit(s) may indicate bit(s) from bit 43−N+1 to bit 43. Hereinafter, in the embodiment of the present invention, a value based on the BSSID used for the AID assignment will be referred to as an 'N-bit value based on the BSSID'.

When the AID is assigned as described above, predetermined bits of the PAID determined according to the embodiment of Equation 1, that is, PAID (8−N+1:8) may have the BSS identification capability. When the PAID has the BSS identification capability, a non-legacy terminal can determine whether the frame is an intra-BSS frame or an inter-BSS frame based on the PAID information of the received frame. In the embodiment of the present invention, the non-legacy terminal may refer to a terminal conforming to the next generation wireless LAN standard (i.e., IEEE 802.11ax). The intra-BSS frame indicates a frame transmitted from a terminal belonging to the same BSS, and the inter-BSS frame indicates a frame transmitted from a terminal belonging to another BSS.

The non-legacy terminal may perform the intra-BSS frame and inter-BSS frame determination using information for identifying the BSS, for example, BSS color, partial BSS color, MAC address, and the like. The partial BSS color may indicate the BCB value of Equation 2. According to an embodiment of the present invention, when AID is assigned according to a specific rule, partial BSS color information may be extracted from predetermined bits of the PAID according to Equation 1. In this case, the predetermined bits of the PAID may indicate the upper N-bit of the PAID, i.e., PAID (8−N+1:8).

The non-legacy terminal may perform different operations depending on whether the received frame is an intra-BSS frame. That is, when the received frame is determined as an intra-BSS frame, the terminal may perform the first operation. In addition, when the received frame is determined as an inter-BSS frame, the terminal may perform the second operation different from the first operation. According to the embodiment of the present invention, the first operation and the second operation may be set in various ways.

According to an embodiment, the terminal may perform channel access based on different thresholds depending on whether the received frame is an intra-BSS frame. More specifically, when the received frame is determined as an intra-BSS frame, the terminal accesses the channel based on the first CCA threshold (i.e., the first operation). That is, the terminal performs a CCA based on the first CCA threshold value, and determines whether the channel is busy based on a result of performing the CCA. On the other hand, when the received frame is determined as an inter-BSS frame, the terminal accesses the channel based on the second CCA threshold value (i.e., the second operation), which is distinct from the first CCA threshold value. That is, the terminal determines whether the channel is busy based on both the first CCA threshold value and the second CCA threshold value. According to the embodiment of the present invention, the second CCA threshold value is an overlapping basic service set (OBSS) PD level set for determining whether a channel is busy according to a received signal strength of an inter-BSS frame. In this case, the second CCA threshold value may have a value equal to or higher than the first CCA threshold value.

According to another embodiment, the terminal may set or update a different network allocation vector (NAV) according to whether the received frame is an intra-BSS frame. More specifically, when the received frame is determined as an intra-BSS frame, the terminal sets or updates the first NAV based on duration information of the corresponding frame (i.e., the first operation). In this case, the first NAV may be an intra-BSS NAV managed to protect an intra-BSS frame. On the other hand, when the received frame is determined as an inter-BSS frame, the terminal sets or updates the second NAV based on the duration information of the frame (i.e., the second operation). In this case, the second NAV may be a basic NAV managed to protect an inter-BSS frame.

According to the embodiment of the present invention, when the received frame is a VHT PPDU, the non-legacy terminal extracts group ID information and PAID information from the preamble (i.e., VHT-SIG-A) of the corresponding frame. When the extracted group ID information is equal to a predetermined value (for example, 63), the non-legacy terminal may determine whether the frame is an intra-BSS frame or an inter-BSS frame based on the extracted PAID information. More specifically, the terminal performs the intra-BSS frame and inter-BSS frame determination by comparing the extracted PAID information with information for identifying a BSS with which the terminal is associated. As described later, the information for identifying a BSS with which the terminal is associated includes a PAID of the terminal, a BSS color announced by the AP with which the terminal is associated, and a partial BSS color announced by the AP with which the terminal is associated according to the embodiment. On the other hand, the predetermined value (i.e., 63) of the group ID information indicates that the frame is a downlink frame.

Meanwhile, when an AID is assigned according to the rule of Equation 2, among the AID candidate values of the corresponding BSS or multiple BSS, values in which AID (8−N+1:8) does not conform to the rule of Equation 2 are not used as AID values. According to an embodiment of the present invention, unused AID values may be used to indicate a group of STAs. More specifically, the AID values that do not conform to the rule of Equation 2 may be implicitly or explicitly designated as an identifier indicating a group of STAs. The identifier indicating the group of STAs may be contained as a STA-ID value in a user field of HE-SIG-B of a high-efficiency (HE) multi-user (MU) PPDU. STAs of the group indicated by the identifier may decode the corresponding resource unit.

Figure 9:
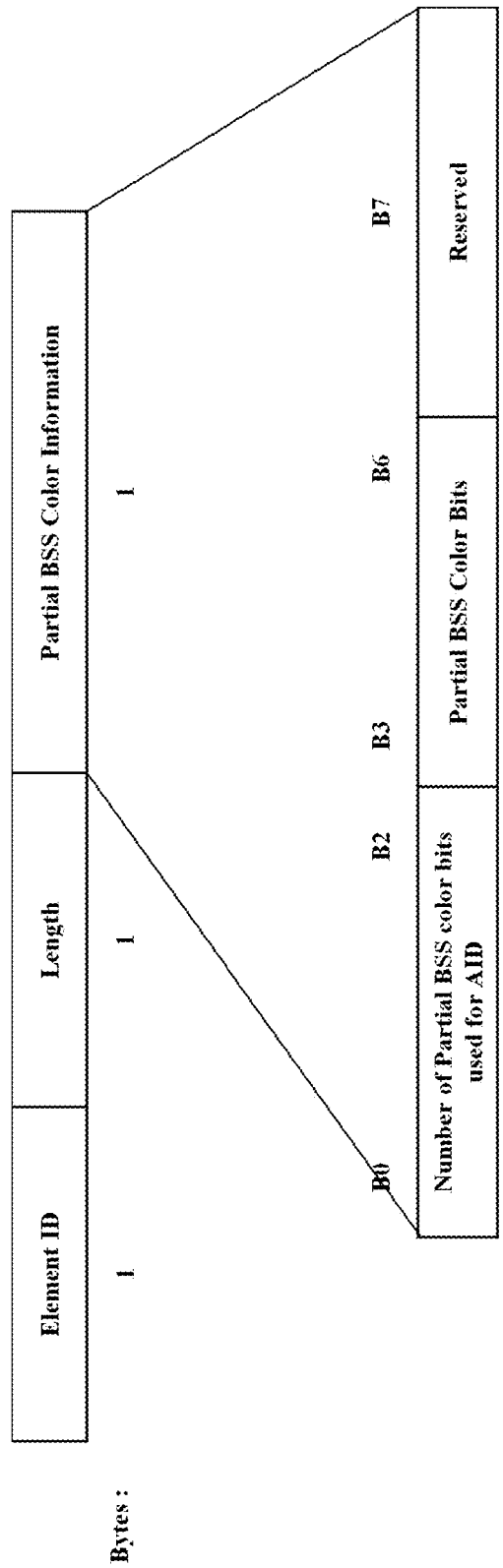
FIG. 9 illustrates a non-legacy element format according to an embodiment of the present invention.

FIG. 9 illustrates a non-legacy element format according to an embodiment of the present invention. The AP may announce the partial BSS color information to STAs using the element shown in FIG. 9. The non-legacy element may be included in a beacon frame, a probe request frame, a probe response frame, an association request frame, an association response frame, a reassociation request frame, a reassociation response frame, and the like. In addition, the non-legacy element may also be transmitted via a frame that contains the element alone.

Referring to FIG. 9, the non-legacy element may include an 'element ID' field, a 'length' field, and a 'partial BSS color information' field. The 'element ID' field indicates the type (for example, 'partial BSS color information element') of the corresponding element. The 'length' field indicates the length information of the corresponding element. The 'partial BSS color information' field may include a 'number of partial BSS color bits used for AID' field, a 'partial BSS color bits' field, and a reserved field. According to an embodiment, the 'partial BSS color information' field may include a 3-bit 'number of partial BSS color bits used for AID' field and a 4-bit 'partial BSS color bits' field.

The 'number of partial BSS color bits used for AID' field indicates the number N of partial BSS color bits used for AID assignment. Depending on the value of N indicated above, the least significant N-bit(s) of the BSS color may be used for AID determination. According to an embodiment, the N may indicate any value between 1 and the maximum number (e.g., 4) of partial BSS color bits. According to another embodiment, the N may further indicate 0 to represent that the partial BSS color is not used in the AID assignment. If N indicates 0, the intra/inter-BSS frame determination method using the PAID information of the VHT PPDU may not be used. According to an embodiment of the present invention, when the value of the 'number of partial BSS color bits used for AID' field, that is, N is set to a value larger than 0, the AP may assign an AID according to the method of Equation 2.

The 'partial BSS color bit' field represents the bit value of the partial BSS color. The 'partial BSS color bit' field may represent the BCB value of Equation 2. In addition, the 'partial BSS color bit' field may be represented by a PAID (8−N+1:8) value according to Equation 1 when the AID is determined according to an embodiment of the present invention. According to an embodiment, the bit value of the partial BSS color may be determined independently of the BSS color. In this way, it is possible to reduce the problem that the partial BSS color value overlaps with that of the neighboring BSS. According to another embodiment, the bit value of the partial BSS color may be determined dependent on the BSS color. In this way, the recipient receiving the BSS color information may estimate the partial BSS color bit value based thereon. According to an embodiment of the present invention, the 'partial BSS color bit' field may be variably determined according to the value of the 'number of partial BSS color bits used for AID' field.

According to the embodiment of the present invention, the partial BSS color may be set by the AP operating the corresponding BSS. The AP announces the set partial BSS color to STAs associated with the BSS. If a multiple BSSID set is used, BSSs in the same multiple BSSID set may use the same partial BSSID color.

According to a further embodiment of the present invention, the AP may change the value of the number N of partial BSS color bits used for AID assignment in the corresponding BSS. If an AID is assigned according to the embodiment of Equation 2, AID(8−N+1:8) has a fixed value in the BSS. Therefore, the larger the number of bits N, the smaller the number of AIDs that can be assigned to STAs. Accordingly, the AP may reduce the value of the number N of bits to perform an association with a larger number of STAs while performing the AID assignment according to the value of the set number N of bits. For example, to associate with a larger number of STAs, the AP may reduce the value of the number N of bits by one. In this case, the remaining bits obtained by subtracting the most significant bit or the least significant bit from the previously used partial BSS color bits can be used as new partial BSS color bits. In addition, the AP may change the partial BSS color bit value used in the corresponding BSS. The AP may send the element shown in FIG. 9 to change the number N of partial BSS color bits and/or the partial BSS color bit value used in the AID assignment as described above.

FIG. 10 illustrates a partial AID calculation process according to an embodiment of the present invention. Referring to FIG. 10, dec(AID[0:8]) (hereinafter, referred to as 'specific bit information of the AID') in FIG. 10($a$) and dec(BSSID[44:47] XOR BSSID[40:43])*2^5 (hereinafter, 'information obtained from the BSSID') in FIG. 10($b$) are summed up in the PAID calculation process according to Equation 1. In this case, in the information obtained from BSSID, five bits from B0 to B4 are all 0 by a multiplication operation of 2^5.

When N is 4 in the AID assignment rule of Equation 2, AID[5:8] is determined to be a fixed value in a BSS by the rule of Equation 2. Thus, a single PAID(8−N+1:8) value is determined within the BSS regardless of the assigned AID value and the BSSID value. However, when N is less than 4 in the AID assignment rule of Equation 2, at least some bits of AID[5:8] may be determined to be a variable value. Accordingly, a plurality of PAID(8−N+1:8) values can be determined within the BSS according to the assigned AID value and the BSSID value. For example, when a B(8−N+1−1) value of the information obtained from the BSSID is 1, in the process of adding the specific bit information of the AID and the information obtained from the BSSID, a rounding up may or may not occur depending on a B(8−N+1−1) value of the specific bit information of the AID. If such ambiguity is not solved, an error may be caused to mis-determine an intra-BSS frame as an inter-BSS frame.

When performing the intra-BSS frame and inter-BSS frame determination based on the PAID information of the received frame, the terminal may check whether the PAID information extracted from the received frame matches PAID information related to a BSS with which the terminal is associated. Here, the PAID information indicates predetermined bits of the PAID. More specifically, the PAID information may indicate upper N-bit of the PAID, i.e., PAID(8−N+1:8). When the PAID information extracted from the received frame matches the PAID information related to the BSS with which the terminal is associated, the terminal determines the received frame as an intra-BSS frame. However, when the PAID information extracted from the received frame does not match the PAID information related to the BSS with which the terminal is associated, the terminal determines the received frame as an inter-BSS frame.

Meanwhile, various PAID comparison methods can be used to solve the problem due to the ambiguity in PAID value determination described above. According to an embodiment, the terminal compares PAID(8−N+1:8) extracted from the received frame with all possible PAID (8−N+1:8)s to perform determination of intra/inter-BSS frame. If the PAID(8−N+1:8) extracted from the received frame matches any one of the possible PAID(8−N+1:8)s in the BSS with which the terminal is associated, the terminal determines the received frame as an intra-BSS frame. However, if the PAID(8−N+1:8) extracted from the received frame does not match any one of the possible PAID(8−N+1:8)s in the BSS with which the terminal is associated, the terminal determines the received frame as an inter-BSS frame. According to the embodiment of the present invention, the intra-BSS frame and inter-BSS frame determination may be performed when the group ID of the received frame is equal to a predetermined value (e.g., 63).

According to another embodiment, the terminal performs the intra/inter-BSS frame determination by comparing the PAID(8−N+1:8) extracted from the received frame with i) PAID(8−N+1:8) of the BSS with which the terminal is associated, ii) PAID'(8−N+1:8) obtained by adding 1 to a B(8−N+1) position of the PAID of the BSS with which the terminal is associated, and iii) PAID"(8−N+1:8) obtained by subtracting 1 from the B(8−N+1) position of the PAID of the BSS with which the terminal is associated. If the PAID(8−N+1:8) extracted from the received frame matches any one of i), ii), and iii), the terminal determines the received frame as an intra-BSS frame. However, if the PAID(8−N+1:8) extracted from the received frame does not match any one of i), ii), and iii), the terminal determines the received frame as an inter-BSS frame. According to the embodiment of the present invention, the intra-BSS frame and inter-BSS frame determination may be performed when the group ID of the received frame is equal to a predetermined value (for example, 63).

In order to solve the problem due to the ambiguity in PAID value determination described above, additional rules may be applied in the AID assignment. According to an embodiment, B(8−N+1−1) of an AID may always be set to 0. According to another embodiment, B(8−N+1−1) of an AID may always be set to 0 when a B(8−N+1−1) value of the information obtained from the BSSID is 0.

On the other hand, the partial BSS colors may be set to the same value in different BSSs. Therefore, if an intra/inter-BSS frame determination result based on the partial BSS color differs from an intra/inter-BSS frame determination result based on a MAC address, the determination result based on the MAC address takes precedence over the determination result based on the partial BSS color. For example, if the received frame is determined as an intra-BSS frame based on the partial BSS color, but the received frame is determined as an inter-BSS frame based on the MAC address, the terminal determines the received frame as an inter-BSS frame. In addition, according to the embodiment of the present invention, if both the condition that the received frame is determined as an intra-BSS frame and the condition that the received frame is determined as an inter-BSS frame are satisfied, the terminal may determine the received frame as an inter-BSS frame.

In a specific embodiment, if the received frame is determined as an intra-BSS frame based on the partial BSS color, but the received frame is determined as an inter-BSS frame based on the MAC address, the terminal may set or update the aforementioned basic NAV. The terminal sets or updates the basic NAV based on the duration field information of the MAC header of the received frame.

FIG. 11 illustrates the partial AID calculation process in more detail according to an embodiment of the present invention. The AP may set the PAID according to the embodiment of Equation 1, and FIGS. 11(a) and 11(b) show the corresponding procedure. As shown in FIG. 11(b), x represents bits from bit 0 to bit 8 of an AID (i.e., AID[0:8]) and y represents (BSSID[44:47] XOR BSSID[40:43])*2^5. z represents the sum of x and y. In addition, FIG. 11(c) shows an assignment rule of bits from bit (8−N+1) to bit 8 (i.e., AID[8−N+1:8]) of AID according to Equation 2.

The process of calculating the PAID will be described with reference to FIGS. 11(a) to 11(c). When AID is assigned according to the rule of FIG. 11(c), the upper N-bit of x are assigned according to the rule of FIG. 11(c). According to an embodiment of the present invention, N may be any value between 1 and 4. However, according to another embodiment of the present invention, N is set to 0 so that the AID assignment method according to the rule of FIG. 11(c) and the intra/inter-BSS frame determination method using the PAID may not be performed. N may be carried through the non-legacy element described in FIG. 9, but the present invention is not limited thereto. The lower 5 bits of y are all set to 0 (i.e., '00000') by the *2^5 operation of FIG. 11(b). z is calculated by adding x and y, and PAID is calculated by performing mod 2^9 operation on the z. If digits are raised from bit position B8 to bit position B9 when z is calculated by adding x and y, the mod operation truncates the raised value.

According to the embodiment of the present invention, the upper N-bit of x are determined by a combination of the partial BSS color value and the N-bit value based on the BSSID, such as the AID assignment rule shown in FIG. 11(c). Thus, the upper N-bit of x are values dependent on the BSS. Also, y is a value dependent on the BSS since it is determined by the K-bit value based on the BSSID. Thus, the upper N-bit of the PAID may be a value dependent on the BSS. According to the embodiment of the present invention, the partial BSS color may be used as information for BSS identification. The partial BSS color may indicate BCB[0:N−1] used in the AID assignment rule of FIG. 11(c). According to an embodiment of the present invention, the partial BSS color may be represented by the upper N-bit of the PAID. However, according to another embodiment of the present invention, the partial BSS color may indicate the upper N-bit of x.

On the other hand, if the ambiguity of the intra-BSS frame and inter-BSS frame determination is not solved, an intra-BSS frame may be erroneously determined as an inter-BSS frame. If the intra-BSS frame is erroneously determined as an inter-BSS frame, the terminal may determine whether the channel is busy based on the second CCA threshold value. In this case, the second CCA threshold value may be set to a value higher than the first CCA threshold value applied to the intra-BSS frame. If the terminal performs channel access based on the second CCA threshold, it may interfere with the received packet. In addition, since the AP is transmitting a packet, the AP cannot receive a packet transmitted by the terminal. In this manner, the intra/inter-BSS frame determination error of the terminal may disturb the intra-BSS operation.

Therefore, a method for solving the ambiguity of the intra-BSS frame and inter-BSS frame determination is needed. Hereinafter, a method of intra-BSS frame and inter-BSS frame determination according to various embodiments of the present invention will be described with reference to the respective drawings. In each embodiment, it is assumed that the received frame is a VHT PPDU and the group ID is set to 63 (i.e., the frame is a downlink frame).

Figure 12:
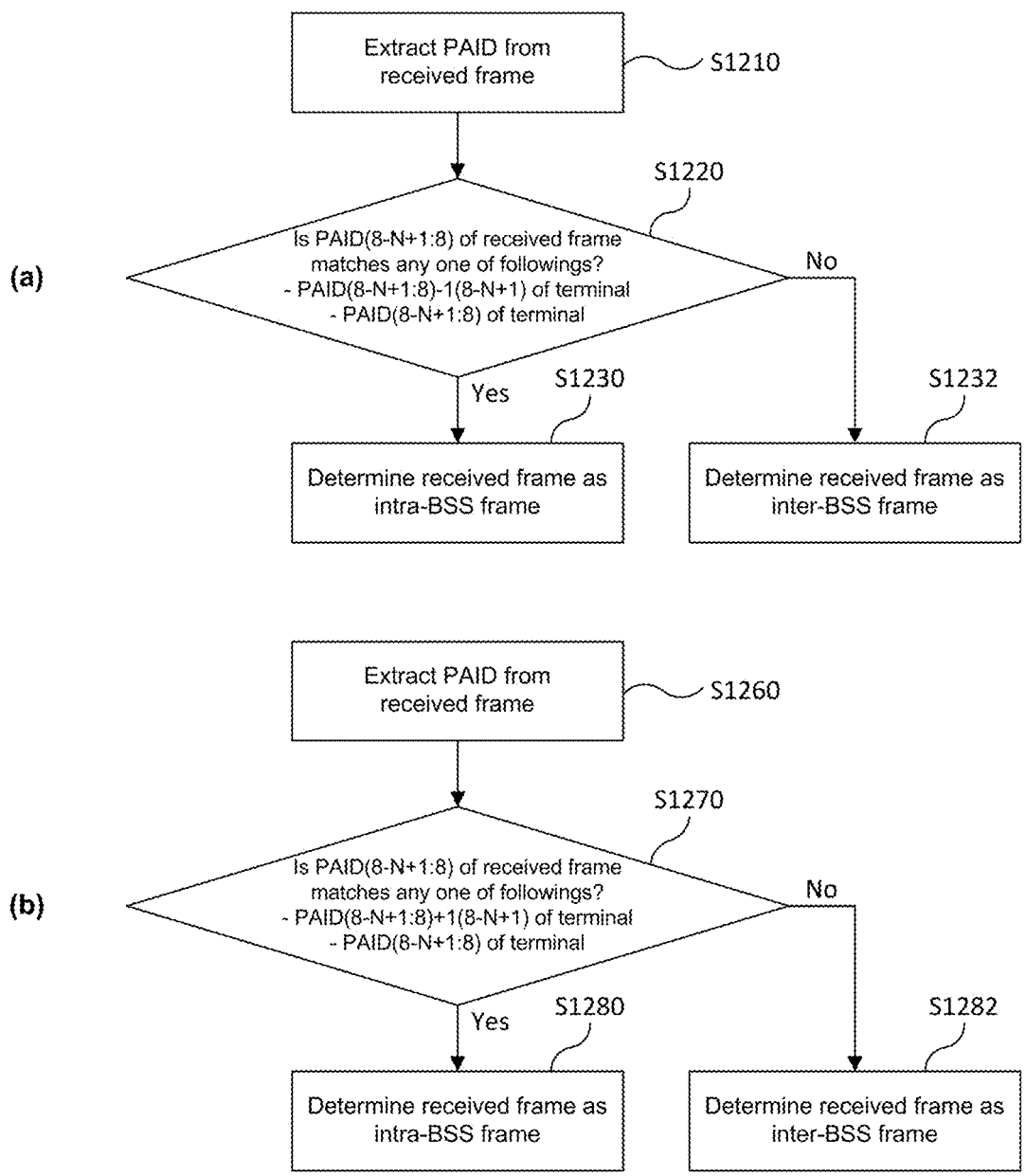
FIG. 12 illustrates the first embodiment of a method of determining an intra-BSS frame and an inter-BSS frame according to the present invention.

FIG. 12 illustrates the first embodiment of a method of determining an intra-BSS frame and an inter-BSS frame according to the present invention. According to an embodiment of the present invention, a plurality of PAID(8−N+1:8) values may be determined in a BSS according to the assigned AID value and the BSSID value. Accordingly, the terminal may compare PAID(8−N+1:8) extracted from the received frame with all possible PAID(8−N+1:8)s in the BSS with which the terminal is associated to perform determination of intra/inter-BSS frame. If the PAID(8−N+1:8) extracted from the received frame matches any one of the possible PAID(8−N+1:8)s in the BSS with which the terminal is associated, the terminal determines the received frame as an intra-BSS frame. However, if the PAID(8−N+1:8) extracted from the received frame does not match any one of the possible PAID(8−N+1:8)s in the BSS with which the terminal is associated, the terminal determines the received frame as an inter-BSS frame.

FIGS. 12(a) and 12(b) show a method for determining whether a received frame is an intra-BSS frame or an inter-BSS frame based on a PAID calculation process of a receiving terminal. FIG. 12(a) shows a determining method in a case where the digits are raised at B(8−N+1−1) in the PAID calculation process of the terminal illustrated in FIG. 10 and FIG. 11. In addition, FIG. 12(b) shows a determining method in a case where the digits are not raised at B(8−N+1−1) in the PAID calculation process of the terminal illustrated in FIG. 10 and FIG. 11.

First, referring to FIG. 12(a), the terminal receives a wireless frame and extracts PAID information from the received frame (S1210). In this case, the group ID may be extracted together from the received frame, and it is assumed that the group ID is equal to 63. The terminal determines whether the PAID(8−N+1:8) of the received frame matches any one of the followings (S1220). a-i) PAID(8−N+1:8) of the terminal, a-ii) PAID(8−N+1:8)−1(8−N+1) of the terminal. Here, 1(8−N+1) indicates the value 1 of the bit(8−N+1) of the PAID. Since the digits have raised in the PAID calculation process of the terminal in the embodiment of FIG. 12(a), PAID'(8−N+1:8) obtained by subtracting 1 from the PAID(8−N+1:8) of the terminal may present in the BSS. Accordingly, the terminal determines whether the PAID(8−N+1:8) of the received frame matches any one of the above a-i) and a-ii). If the PAID(8−N+1:8) extracted from the received frame matches any one of the a-i) a-ii), and the terminal determines the received frame as an intra-BSS frame (S1230). However, if PAID(8−N+1:8) extracted from the received frame does not match any one of the a-i) and a-ii), the terminal determines the received frame as an inter-BSS frame.

Next, referring to FIG. 12(b), the terminal receives a wireless frame and extracts PAID information from the received frame (S1260). In this case, the group ID may be extracted together from the received frame, and it is assumed that the group ID is equal to 63. The terminal determines whether the PAID(8−N+1:8) of the received frame matches any of the followings (S1270). b-i) PAID(8−N+1:8) of the terminal, b-ii) PAID(8−N+1:8)+1(8−N+1) of the terminal. Here, 1(8−N+1) indicates the value 1 of the bit(8−N+1) of the PAID. Since the digits have not raised in the PAID calculation process of the terminal in the embodiment of FIG. 12(b), PAID"(8−N+1:8) obtained by adding 1 to PAID(8−N+1:8) of the terminal may present in the BSS. Accordingly, the terminal determines whether the PAID(8−N+1:8) of the received frame matches any one of the above b-i) and b-ii). If the PAID(8−N+1:8) extracted from the received frame matches any one of the b-i) and b-ii), the terminal determines the received frame as an intra-BSS frame (S1280). However, if PAID(8−N+1:8) extracted from the received frame does not match any one of the b-i) and b-ii), the terminal determines the received frame as an inter-BSS frame (S1282).

Figure 13:
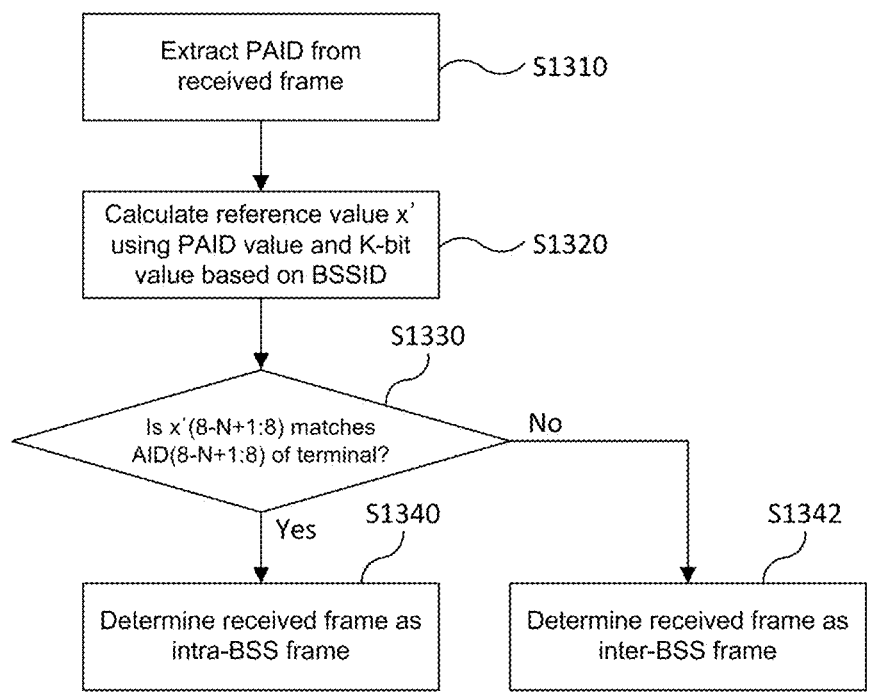
FIG. 13 illustrates the second embodiment of a method of determining an intra-BSS frame and an inter-BSS frame according to the present invention.

FIG. 13 illustrates the second embodiment of a method of determining an intra-BSS frame and an inter-BSS frame according to the present invention. According to the second embodiment of the present invention, the terminal calculates a reference value x' for intra/inter-BSS frame determination using PAID value of the received frame and the K-bit value based on the BSSID of the BSS with which the terminal is associated.

More specifically, the terminal receives a wireless frame and extracts PAID information from the received frame (S1310). In this case, the group ID may be extracted together from the received frame, and it is assumed that the group ID is equal to 63. The terminal calculates the reference value x' using the PAID value of the received frame and the K-bit value based on the BSSID of the BSS with which the terminal is associated (S1320). In the embodiment of the present invention, the reference value x' may be determined by a combination of the PAID value of the received frame and the K-bit value based on the BSSID of the BSS with which the terminal is associated. More specifically, the reference value x' can be calculated by subtracting, the multiplication (i.e., y') of the K-bit value based on the BSSID of the BSS with which the terminal is associated and 2^5, from the PAID value (i.e., (x+y) mod 2^9 in FIG. 11) of the received frame. A specific embodiment thereof will be described later with reference to FIG. 14. The terminal determines whether the reference value x'(8−N+1:8) matches AID(8−N+1:8) of the terminal (S1330). If the reference value x'(8−N+1:8) matches the AID(8−N+1:8) of the terminal, the terminal determines the received frame as an intra-BSS frame (S1340). However, if the reference value x'(8−N+1:8) does not match the AID(8−N+1:8) of the terminal, the terminal determines the received frame as an inter-BSS frame (S1342).

FIG. 14 illustrates a process of calculating a reference value and a process of calculating a partial AID for intra/inter-BSS frame determination according to an embodiment of the present invention. In the embodiment of FIG. 14, the definition of each variable is as follows.

PAID indicates a partial AID extracted from a received frame. The PAID can be extracted from VHT-SIG-A1 of the received VHT PPDU.

x denotes AID(0:8) of the intended recipient of the frame.

y denotes (BSSID[44:47] XOR BSSID[40:43])*2^5 of a BSS to which a terminal that transmitted the frame belongs.

y' denotes (BSSID[44:47] XOR BSSID[40:43])*2^5 of a BSS with which a terminal receiving the frame is associated.

In other words, y denotes a multiplication of 2^5 and a K-bit value based on the BSSID of the BSS with which the terminal that transmitted the frame is associated, and y' denotes a multiplication of 2^5 and a K-bit value based on the BSSID of the BSS with which the terminal receiving the frame is associated. In the embodiment of FIG. 14, x' represents a 9-bit binary value. A separate bin[x', 9] operation may be performed to obtain a binary number x' from the value calculated according to the embodiment of FIG. 14(a).

First, FIG. 14(a) shows a process of calculating a reference value x' for intra/inter-BSS frame determination. The terminal receiving the frame compares the PAID extracted from the received frame with y'. If PAID-y' is less than 0 (i.e., Case RX1), the terminal sets x' to be PAID-y'+2^9. However, if PAID-y' is equal to or greater than 0 (i.e., Case RX2), the terminal sets x' to be PAID-y'. The terminal may perform intra/inter-BSS frame determination similar to the embodiment of FIG. 13 using the reference value x' thus calculated.

Next, FIG. 14(b) shows a process of calculating the PAID by the terminal transmitting the PPDU. Referring to the embodiment of FIG. 11, the PAID may be calculated by (x+y) mod 2^9. Since x and y are 9-bit values, x and y satisfy the following conditions, respectively.

$$0 <= x < 2^9, 0 <= y < 2^9$$

Therefore, x+y satisfies the following condition.

$$0 <= x+y < 2^{10}$$

Therefore, according to the embodiment of the present invention, the PAID may be calculated as follows. If x+y is equal to or greater than 2^9 (i.e., Case TX1), the PAID is set to x+y-2^9. However, if x+y is less than 2^9 (i.e., Case TX2), the PAID is set to x+y.

The intra/inter-BSS frame determination process of the receiving terminal when the reference value x' is used according to the embodiment of the present invention will be described as follows. First, if the frame received by the terminal is an intra-BSS frame, the receiving terminal determines as follows. When the terminal receives an intra-BSS frame, both y and y' are determined based on the same BSSID, therefore y=y' is satisfied.

A-1) When the transmitting terminal calculates the PAID by Case Tx1

According to the equation of Case Tx1, PAID-y=x-2^9 is satisfied. In this case, since x is less than 2^9, PAID-y<0. Since the values of y and y' are the same, PAID-y'<0 is satisfied, and the receiving terminal calculates x' according to Case Rx1. In this case, x' satisfies the following equation.

$$x'=PAID-y'+2^9=PAID-y+2^9=x \qquad \text{[Equation 3]}$$

That is, x'=x is satisfied and x'(8-N+1:8)=x(8-N+1:8). When the AID of each terminal is assigned according to the above-mentioned rule, terminals of the same BSS have the same AID(8-N+1:8) value. Accordingly, x'(8-N+1:8) matches AID(8-N+1:8) of the receiving terminal and the receiving terminal determines that the frame is an intra-BSS frame.

A-2) When the transmitting terminal calculates the PAID by Case Tx2

According to the equation of Case Tx2, PAID-y=x is satisfied. In this case, since x is equal to or greater than 0, PAID-y>=0. Since the values of y and y' are the same, PAID-y'>=0 is satisfied, and the receiving terminal calculates x' according to Case Rx2. In this case, x' satisfies the following Equation.

$$x'=PAID-y'=PAID-y=x \qquad \text{[Equation 4]}$$

That is, x'=x is satisfied and x'(8-N+1:8)=x(8-N+1:8). When the AID of each terminal is assigned according to the above-mentioned rule, terminals of the same BSS have the same AID(8-N+1:8) value. Accordingly, x'(8-N+1:8) matches AID(8-N+1:8) of the receiving terminal and the receiving terminal determines that the frame is an intra-BSS frame.

Next, if the frame received by the terminal is an inter-BSS frame, the receiving terminal determines as follows. When the terminal receives an inter-BSS frame, since y and y' are determined based on different BSSIDs, there is a high probability that y and y' represent different values.

B-1) When the transmitting terminal calculates the PAID by Case Tx1 and the receiving terminal calculates x' by Case RX1

In this case, x' satisfies the following equation.

$$x'=PAID-y'+2^9=x+y-2^9-y'+2^9=x+y-y' \qquad \text{[Equation 5]}$$

Therefore, when y and y' are different, x' and x are different. Since the lower 5 bits of y and y' are all 0, x'(5:8) and x(5:8) are different. When N is set to a value of 4 or less, x'(8-N+1:8) indicates at least some bits of x'(5:8) and x(8-N+1:8) indicates at least some bits of x(5:8). Therefore, there is a high probability that x'(8-N+1:8) and x(8-N+1:8) are different from each other. As a result, there is a high probability that x'(8-N+1:8) is different from AID(8-N+1:8) of the receiving terminal. Accordingly, the receiving terminal has a high probability of determining that the frame is an inter-BSS frame.

B-2) When the transmitting terminal calculates the PAID by Case Tx2 and the receiving terminal calculates x' by Case RX1

In this case, x' satisfies the following equation.

$$x'=PAID-y'+2^9=x+y-y'+2^9 \qquad \text{[Equation 6]}$$

In this case, since -2^9<y-y'<2^9 is satisfied, x' and x are different when y and y' are different. As described above, when x' and x are different, there is a high probability that x'(8-N+1:8) and x(8-N+1:8) are different from each other. As a result, there is a high probability that x'(8-N+1:8) is different from AID(8-N+1:8) of the receiving terminal. Accordingly, the receiving terminal has a high probability of determining that the frame is an inter-BSS frame.

B-3) When the transmitting terminal calculates the PAID by Case Tx1 and the receiving terminal calculates x' by Case RX2

In this case, x' satisfies the following equation.

$$x'=PAID-y'=x+y-2^9-y'=x+y-y'-2^9 \qquad \text{[Equation 7]}$$

In this case, since -2^9<y-y'<2^9 is satisfied, x' and x are different when y and y' are different. As described above, when x' and x are different, there is a high probability that x'(8-N+1:8) and x(8-N+1:8) are different from each other. As a result, there is a high probability that x'(8-N+1:8) is different from AID(8-N+1:8) of the receiving terminal. Accordingly, the receiving terminal has a high probability of determining that the frame is an inter-BSS frame.

B-4) When the transmitting terminal calculates the PAID by Case Tx2 and the receiving terminal calculates x' by Case RX2

In this case, x' satisfies the following equation.

$$x'=PAID-y'=x+y-y' \qquad \text{[Equation 8]}$$

When y and y' are different, x' and x are different. As described above, when x' and x are different, there is a high probability that x'(8-N+1:8) and x(8-N+1:8) are different from each other. As a result, there is a high probability that x'(8-N+1:8) is different from AID(8-N+1:8) of the receiving terminal. Accordingly, the receiving terminal has a high probability of determining that the frame is an inter-BSS frame.

Meanwhile, the determination method of comparing the PAID(8-N+1:8) of the received frame with the PAID(8-N+1:8) of the terminal has both the possibility where an inter-BSS frame is erroneously determined as an intra-BSS frame and the possibility where an intra-BSS frame is erroneously determined as an inter-BSS frame. However, in the determination method according to the embodiment of FIG. 13, although there is a possibility where an inter-BSS frame is erroneously determined as an intra-BSS frame, there is no case where the intra-BSS frame is erroneously determined as an inter-BSS frame.

According to a further embodiment of the present invention, the terminal may compare the value calculated by using x'(8−N+1:8) and y'(8−N+1:8) with the partial BSS color value (i.e., BCB information) to perform intra/inter-BSS frame determination. More specifically, when a value of x'(8−N+1:8)−y'(8−N+1:8) is less than 0, the terminal determines whether a value of x'(8−N+1:8)−y'(8−N+1:8)+2^N matches the partial BSS color value announced to the terminal. If they match, the terminal determines the received frame as an intra-BSS frame. If they do not match, the terminal determines the received frame as an inter-BSS frame. On the other hand, when the value of x'(8−N+1:8)−y'(8−N+1:8) is equal to or greater than 0, the terminal determines whether a value of x'(8−N+1:8)−y'(8−N+1:8) matches the partial BSS color value announced to the terminal. If they match, the terminal determines the received frame as an intra-BSS frame. If they do not match, the terminal determines the received frame as an inter-BSS frame.

The determination methods according to the embodiments of FIGS. 12 to 14 may be performed when the terminal has verified that there is ambiguity in PAID value determination. As an embodiment, if the terminal has verified that there is no ambiguity in PAID determination, the terminal may compare the PAID(8−N+1:8) of the received frame with the PAID(8−N+1:8) of the terminal to perform intra/inter-BSS frame determination. That is, if the PAID(8−N+1:8) extracted from the received frame matches the PAID(8−N+1:8) of the terminal, the terminal determines the received frame as an intra-BSS frame. However, if the PAID(8−N+1:8) extracted from the received frame does not match the PAID(8−N+1:8) of the terminal, the terminal determines the received frame as an inter-BSS frame.

Whether or not the ambiguity in PAID value determination exists can be recognized by the terminal according to various embodiments. According to an embodiment, the terminal may determine that ambiguity exists if y(5:8−N+1−1) is all 0, and it may determine that ambiguity does not exist if not. According to another embodiment, the terminal may determine that ambiguity does not exist if N=4, and it may determine that ambiguity exists if N is any one of 1 to 3. Here, N represents the number of partial BSS color bits used for AID assignment and the number of bits of the BSSID information. According to yet another embodiment, the terminal may recognize whether there is ambiguity in PAID value determination by the method described in FIGS. 15 and 16.

FIG. 15 illustrates a non-legacy element format according to another embodiment of the present invention. Among the fields of the non-legacy element in FIG. 15, duplicative description of parts which are the same as the field of the non-legacy element described in FIG. 9 will be omitted.

Referring to FIG. 15, the non-legacy element may include an 'element ID' field, a 'length' field, and a 'partial BSS color information' field. In addition, the 'partial BSS color information' field may include a 'number of partial BSS color bits used for AID' field, a 'partial BSS color bits' field, and an 'ambiguity' field. According to an embodiment, the 'partial BSS color information' field includes a 3-bit 'number of partial BSS color bits used for AID' field, a 4-bit 'partial BSS color bits' field, and a 1-bit 'ambiguity' field. The 'ambiguity' field signals whether there is ambiguity in PAID value determination through a flag value.

FIG. 16 illustrates a method of signaling information of the number of partial BSS color bits and ambiguity information according to another embodiment of the present invention. According to the embodiment of the present invention, the 'number of partial BSS color bits used for AID' field of the non-legacy element may signal whether the above-described ambiguity can exist. More specifically, the 'number of partial BSS color bits used for AID' field may indicate, through predetermined indices, both the number of partial BSS color bits used for AID assignment and whether the ambiguity can exist. For example, indices 1 through 4 may indicate that the number of partial BSS color bits used for the AID assignment is 1 through 4, respectively, and that the ambiguity does not exist. On the other hand, when the number of partial BSS color bits used for the AID assignment is 4, the ambiguity in PAID value determination may not exist. Thus, indices 5 through 7 may additionally indicate that the number of partial BSS color bits used for the AID assignment is 1 through 3, respectively, and that the ambiguity can exist.

Figure 17:
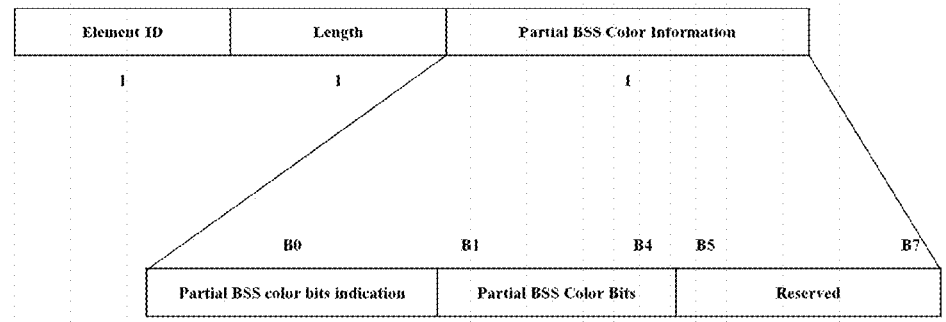
FIG. 17 illustrates the second embodiment of an AID assignment method and a non-legacy element format according to the present invention.

FIG. 17 illustrates the second embodiment of an AID assignment method and a non-legacy element format according to the present invention. FIG. 17(a) shows an AID assignment method according to another embodiment of the present invention, and FIG. 17(b) shows the non-legacy element format corresponding thereto.

First, referring to FIG. 17(a), the second embodiment of the AID assignment method according to the present invention can be expressed as Equation 9 below.

$$AID(8\text{−}N\text{+}1\text{:}8)=bin[dec(BCB(0\text{:}N\text{−}1)+dec(BSSID(47\text{−}N\text{+}1\text{:}47) \text{ XOR } BSSID(43\text{−}N\text{+}1\text{:}43))) \bmod 2^N, N] \quad \text{[Equation 9]}$$

Herein, N is 4.

The second embodiment of the AID assignment method according to the present invention is the same as the first embodiment of the AID assignment method described with reference to Equation 2, where N is limited to 4. More specifically, the predetermined N-bits of the AID are determined using the value (i.e., the partial BSS color value) of the least significant N-bit(s) of the BSS color and the N-bit value based on the BSSID. That is, the predetermined N-bits of the AID are determined by applying modulo operation to the value of sum of the least significant N-bit(s) of the partial BSS color and the N-bit value based on the BSSID. In this case, the predetermined N-bits of the AID is bit(s) from bit 8−N+1 to bit 8 of the AID, and N is set to 4. According to the above-described PAID setting rule of FIG. 1, the number K of the significant bits of the value based on the BSSID used for setting the PAID is set to 4. According to the embodiment of the present invention, ambiguity in PAID value determination can be eliminated by setting N in the AID assignment rule to 4, which is the same value as K used for setting the PAID.

Referring to 17(b), the 'partial BSS color information' field of the non-legacy element may include a 1-bit 'partial BSS color bits indication' field and a 4-bit 'partial BSS color bits' field. The 'partial BSS color bits indication' field indicates whether the corresponding BSS applies the AID assignment rule in which partial BSS color bits are used. If the field is set to 1, an N-bit (where N is 4) partial BSS color value is used for the AID assignment. However, if the field is set to 0, the partial BSS color is not used for the AID assignment. According to the embodiment of FIG. 17, the number N of the partial BSS color bits used for the AID assignment is fixed. Thus, the non-legacy element may indicate whether the partial BSS color is used for the AID assignment via the 1-bit 'partial BSS color bits indication' field.

According to yet another embodiment of the present invention, the 'partial BSS color information' field of the non-legacy element may include only the 'partial BSS color bits' field without a separate 'partial BSS color bits indication' field. When the information of 'partial BSS color bits' field is signaled through the 'partial BSS color information' field, the terminal receiving the non-legacy element may recognize that the partial BSS color value is used for the AID assignment.

FIG. 18 illustrates the third embodiment of an AID assignment method according to the present invention. Referring to FIG. 18, the third embodiment of the AID assignment method according to the present invention can be expressed as Equation 10 below.

if $(dec(BCB[0:N-1])-dec(BSSID[47-N+1:47]$ XOR $BSSID[43-N+1:43]))<0 AID[8-N+1:8]=bin$
$[(2^N+dec(BCB[0:N-1])-dec(BSSID[47-N+1:47]$ XOR $BSSID[43-N+1:43])),N]$ else $//(dec(BCB[0:N-1])-dec(BSSID[47-N+1:47]$ XOR $BSSID[43-N+1:43]))>=0 AID[8-N+1:8]=$
$bin[(dec(BCB[0:N-1])-dec(BSSID[47-N+1:47]$ XOR $BSSID[43-N+1:43])),N]$ [Equation 10]

Herein, N is any integer between 1 and 4.

According to the third embodiment of the present invention, the bit(s) from bit 8−N+1 to bit 8 of the AID may be set by the rule of Equation 10. According to the embodiment of Equation 10, the predetermined N-bit(s) of the AID may be determined based on a value obtained by subtracting the BSSID information from the BCB information. In this case, the predetermined N-bit(s) of the AID is bit(s) from bit 8−N+1 to bit 8 of the AID. More specifically, the predetermined N-bit(s) of the AID is determined by subtracting the N-bit value based on the BSSID from the value (i.e., the partial BSS color value) of the least significant N-bit(s) of the BSS color. The N-bit value based on the BSSID indicates the exclusive OR of the first predetermined N-bit(s) of the BSSID and the second predetermined N-bit(s) of the BSSID. In the embodiment of Equation 10, the first predetermined N-bit(s) may indicate bit(s) from bit 47−N+1 to bit 47 and the second predetermined N-bit(s) may indicate bit(s) from bit 43−N+1 to bit 43.

If the value obtained by subtracting the N-bit value based on the BSSID from the partial BSS color value is less than 0, the predetermined N-bit(s) of the AID is determined by adding 2^N to the value obtained by subtracting the N-bit value based on the BSSID from the partial BSS color value. However, if the value obtained by subtracting the N-bit value based on the BSSID from the partial BSS color value is equal to or greater than 0, the predetermined N-bit(s) of the AID is determined by a value obtained by subtracting the N-bit value based on the BSSID from the partial BSS color value.

When the AID is assigned according to the rule of Equation 10, the predetermined N-bit(s) of the AID and the N-bit(s) of the PAID corresponding thereto may have a BSS identification capability. Accordingly, when the received frame is a VHT PPDU (and the group ID extracted from the received frame is equal to 63), the terminal may perform the intra-BSS frame and inter-BSS frame determination by comparing the upper N-bit(s) of the PAID extracted from the received frame with the partial BSS color announced to the terminal. If the upper N-bit(s) of the PAID matches the partial BSS color announced to the terminal, the terminal determines the received frame as an intra-BSS frame. However, if the upper N-bit(s) of the PAID does not match the partial BSS color announced to the terminal, the terminal determines the received frame as an inter-BSS frame.

FIG. 19 illustrates the fourth embodiment of an AID assignment method according to the present invention. Referring to FIG. 18, the fourth embodiment of the AID assignment method according to the present invention can be expressed as Equation 11 below.

$AID[5:5+N-1]=bin[(dec(BCB[0:N-1])+dec$
$(BSSID[44:44+N-1]$ XOR BSSID
$[40:40+N-1])) \bmod 2^N,N]$ [Equation 11]

Herein, N is any integer between 1 and 4.

According to the fourth embodiment of the present invention, the bit(s) from bit 5 to bit 5+N−1 of the AID may be set by the rule of Equation 11. According to the embodiment of Equation 11, the predetermined N-bit(s) of the AID are determined by applying a modulo operation to the value of sum of the value (i.e., the partial BSS color value) of the least significant N-bit(s) of the BSS color and the N-bit value based on the BSSID. In this case, the predetermined N-bit(s) of the AID is bit(s) from bit 5 to bit 5+N−1 of the AID. The N-bit value based on the BSSID indicates the exclusive OR of the first predetermined N-bit(s) of the BSSID and the second predetermined N-bit(s) of the BSSID. In the embodiment of Equation 11, the first predetermined N-bit(s) may indicate bit(s) from bit 44 to bit 44+N−1, and the second predetermined N-bit(s) may indicate bit(s) from bit 40 to bit 40+N−1.

As described above with reference to FIG. 11, in the PAID calculation process, the lower 5 bits of y are all set to 0 (i.e., '00000'). In this case, PAID(5:5+N−1) is set to a fixed value in the BSS when bit(s) from bit 5 to bit 5+N−1 of the AID are set according to the rule of Equation 11. Therefore, when the AID is assigned according to the rule of Equation 11, ambiguity in PAID value determination can be prevented. Also, predetermined bits of the PAID, i.e., PAID(5:5+N−1) may have the BSS identification capability. Therefore, when the received frame is a VHT PPDU (and the group ID extracted from the received frame is equal to 63), the terminal may perform the intra-BSS frame and inter-BSS frame determination by comparing PAID(5:5+N−1) of the PAID extracted from the received frame with PAID(5:5+N−1) of the BSS with which the terminal is associated. If the PAID(5:5+N−1) of the received frame matches the PAID(5:5+N−1) of the BSS with which the terminal is associated, the terminal determines the received frame as an intra-BSS frame. However, if the PAID(5:5+N−1) of the received frame does not match the PAID(5:5+N−1) of the BSS with which the terminal is associated, the terminal determines the received frame as an inter-BSS frame.

Figures 21, 22:
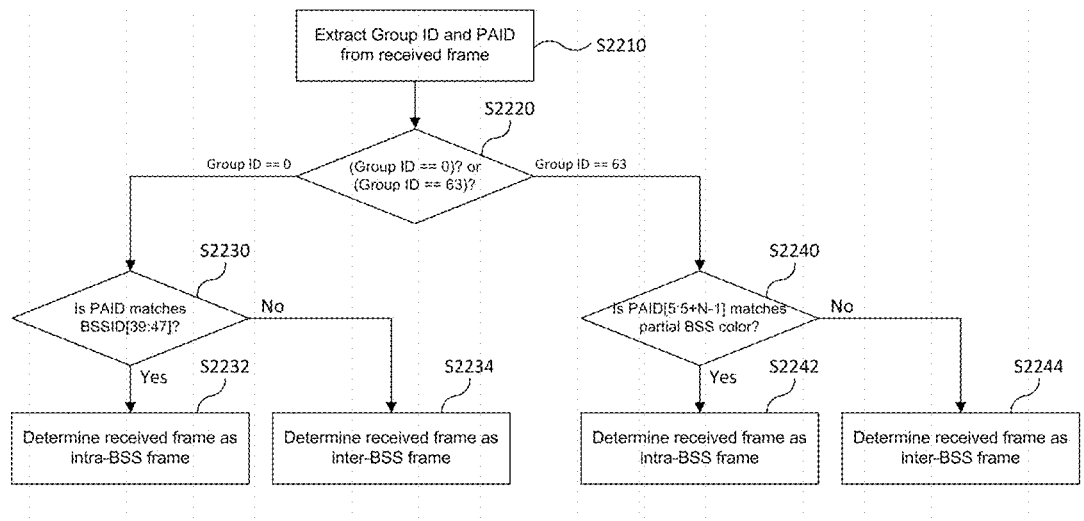

FIGS. 20 and 21 illustrate the fifth embodiment of an AID assignment method according to the present invention. Referring to FIG. 20, the fifth embodiment of the AID assignment method according to the present invention can be expressed as Equation 12 below.

$AID[5:5+N-1]=bin[(dec(BCB[0:N-1])-dec$
$(BSSID[44:44+N-1]$ XOR BSSID
$[40:40+N-1])) \bmod 2^N,N]$ [Equation 12]

Herein, N is any integer between 1 and 4.

According to the fifth embodiment of the present invention, bit(s) from bit 5 to bit 5+N−1 of the AID may be set by the rule of Equation 12. According to the embodiment of Equation 12, the predetermined N-bit(s) of the AID may be determined based on a value obtained by subtracting the BSSID information from the BCB information. More specifically, the predetermined N-bit(s) of the AID are determined by applying a modulo operation to the value obtained by subtracting the N-bit value based on the BSSID from the value (i.e., the partial BSS color value) of the least significant N-bit(s) of the BSS color. In this case, the predetermined N-bit(s) of the AID is bit(s) from bit 5 to bit 5+N−1 of the AID. The N-bit value based on the BSSID indicates the exclusive OR of the first predetermined N-bit(s) of the BSSID and the second predetermined N-bit(s) of the BSSID. In the embodiment of Equation 12, the first predetermined N-bit(s) may indicate bit(s) from bit 44 to bit 44+N−1, and the second predetermined N-bits(s) may indicate bits(s) from bit 40 to bit 40+N−1.

The fifth embodiment of the AID assignment method according to the present invention may also be expressed as shown in FIG. 21 and Equation 13 below.

if $(dec(BCB[0:N-1])-dec(BSSID[44:44+N-1]$ XOR $BSSID[40:40+N+1]))<0$ AID$[5:5+N-1]$=bin$[(2^N+dec(BCB[0:N-1])-dec(BSSID[44:44+N-1]$ XOR $BSSID[40:40+N-1])),N]$ else //$(dec(BCB[0:N-1])-dec(BSSID[44:44+N-1]$ XOR $BSSID[40:40+N-1]))>=0$ AID$[5:5+N-1]$= bin$[(dec(BCB[0:N-1])-dec(BSSID[44:44+N-1]$ XOR $BSSID[40:40+N-1])),N]$  [Equation 13]

Herein, N is any integer between 1 and 4.

Referring to Equation 13, if the value obtained by subtracting the N-bit value based on the BSSID from the partial BSS color value is less than 0, the predetermined N-bit(s) of the AID is determined by adding $2^N$ to the value obtained by subtracting the N-bit value based on the BSSID from the partial BSS color value. However, if the value obtained by subtracting the N-bit value based on the BSSID from the partial BSS color value is equal to or greater than 0, the predetermined N-bit(s) of the AID is determined by a value obtained by subtracting the N-bit value based on the BSSID from the partial BSS color value.

As described above with reference to FIG. 11, in the PAID calculation process, the lower 5 bits of y are all set to 0 (i.e., '00000'). In this case, PAID[5:5+N−1] is set to a fixed value in the BSS when bit(s) from bit 5 to bit 5+N−1 of the AID are set according to the rule of Equations 12 and 13. Therefore, when the AID is assigned according to the rule of Equations 12 and 13, ambiguity in PAID value determination can be prevented.

In addition, if the AID is assigned according to the rule of Equations 12 and 13, at least a portion of the K-bit value (i.e., y in FIG. 11) based on the BSSID is offset by the N-bit value based the BSSID when the PAID is set according to the embodiment of Equation 1. Thus, the predetermined bits (i.e., PAID[5:5+N−1]) of the PAID represent the partial BSS color value announced to the intended recipient of the frame. Accordingly, when the received frame is a VHT PPDU (and the group ID extracted from the received frame is equal to 63), the terminal may perform the intra-BSS frame and inter-BSS frame determination by comparing the predetermined bits of the PAID extracted from the received frame with the partial BSS color announced to the terminal. If the predetermined bits of the PAID match the partial BSS color announced to the terminal, the terminal determines the received frame as an intra-BSS frame. However, if the predetermined bits of the PAID do not match the partial BSS color announced to the terminal, the terminal determines the received frame as an inter-BSS frame.

Hereinafter, the reason why the predetermined bits (i.e., PAID[5:5+N−1]) of the PAID represent the partial BSS color value when the fifth embodiment of the AID assignment method according to the present invention is used will be described in more detail. If the received frame is a VHT PPDU and the frame is a downlink single-user (SU) frame, the PAID extracted from the frame is determined according to Equation 1. In this case, the AID[0:8] is expressed as Equation 14 when it is divided into the lower 5 bits (i.e., AID[0:4]), the next N-bit(s) (i.e., AID[5:5+N−1]) and the remaining bit(s) (i.e., AID[5+N:8]).

PAID=$(dec(AID[0:4])+AID[5:5+N-1]*2^5)+AID[5+N:8]*2^(5+N))+dec(BSSID[44:47]$ XOR BSSID$[40:43])*2^5)$ mod $2^9$  [Equation 14]

(Case a) when $dec(BCB[0:N-1])-dec(BSSID[44:44+N-1]$ XOR $BSSID[40:40+N-1]))<0$

Since $0<=dec(BCB[0:N-1])<2^N$, and $0<=dec(BSSID[44:44+N-1]$ XOR $BSSID[40:40+N-1]))<2^N$, AID[5:5+N−1] is determined as follows according to the if condition of Equation 13.

AID$[5:5+N-1]$=bin$[(2^N+dec(BCB[0:N-1])-dec(BSSID[44:44+N-1]$ XOR $BSSID[40:40+N-1])),N]$  [Equation 15]

(Case a-1) when N is not 4

Substituting Equation 15 into Equation 14 yields the following equation.

PAID=$(dec(AID[0:4])+(2^N+dec(BCB[0:N-1])-dec(BSSID[44:44+N-1]$ XOR $BSSID[40:40+N-1]))*2^5)+dec(AID[5+N:8])*2^(5+N))+dec(BSSID[44:44+N-1]$ XOR $BSSID[40:40+N-1])+(BSSID[44+N:47]$ XOR $BSSID[40+N:43])*2^N)*2^5)$ mod $2^9$  [Equation 16]

Here, a part of the values based on the BSSID, that is, $dec(BSSID[44:44+N-1]$ XOR $BSSID[40:40+N-1])$ is offset (i.e. canceled) and the equation can be rearranged as follows.

PAID=$(dec(AID[0:4])+2^(5+N)+dec(BCB[0:N-1])*2^5+dec(AID[5+N:8])*2^(5+N)+dec((BSSID[44+N:47]$ XOR $BSSID[40+N:43])*2^(5+N))$ mod $2^9$  [Equation 17]

Referring to Equation 17, the only factor that affects PAID[5:5+N−1] is $dec(BCB[0:N-1]*2^5)$. Therefore, PAID[5:5+N−1] is equal to BCB[0:N−1].

(Case a-2) when N is 4

When N is 4, $dec(BSSID[44:44+N-1]$ XOR $BSSID[40:40+N-1])$ of Equation 15 is the same as $dec(BSSID[44:47]$ XOR $BSSID[40:43])$ of Equation 14. Therefore, substituting the Equation 15 into the Equation 14 yields the following equation.

$$PAID = (dec(AID[0:4]) + (2^\wedge N + dec(BCB[0:N-1]))*$$
$$2^\wedge 5 + dec(AID[5+N:8])*2^\wedge(5+N)))\bmod 2^\wedge 9$$
$$= (dec(AID[0:4]) + 2^\wedge(5+N) + dec(BCB[0:N-1])*2^\wedge 5 + dec(AID[5+N:8])*2^\wedge(5+N)))\bmod 2^\wedge 9$$

[Equation 18]

Referring to Equation 18, the only factor that affects PAID[5:5+N−1] is dec (BCB[0:N−1]*2 ^5). Therefore, PAID[5:5+N−1] is equal to BCB[0:N−1].

(Case b) when $dec(BCB[0:N-1])-dec(BSSID[44:44+N-1]$ XOR $Bssid[40:40+N-1]))>=0$ Since $0 \leq dec(BCB[0:N-1]) < 2^N$, and $0 \leq dec(BSSID[44:44+N-1]$ XOR $BSSID[40:40+N-1])) < 2^N$, AID[5:5+N-1] is determined as follows according to the else condition of Equation 13.

AID[5:5+N−1]=bin[(dec(BCB[0:N−1])−dec(BSSID  [Equation 19]
[44:44+N−1] XOR BSSID[40:40+N−1])),N]

(Case b-1) when N is not 4

Substituting Equation 19 into Equation 14 yields the following equation.

PAID=(dec(AID[0:4])+(dec(BCB[0:N−1])−dec
(BSSID[44:44+N−1] XOR BSSID[40:40+N−
1]))* 2^5+dec(AID[5+N:8])*2^(5+N)+dec
(BSSID[44:44+N−1] XOR BSSID[40:40+N−1]+
(BSSID[44+N:47]XOR BSSID[40+N:43])*2^N)
*2^5) mod 2^9   [Equation 20]

Here, a part of the values based on the BSSID, that is, dec(BSSID[44:44+N−1] XOR BSSID[40:40+N−1]) is offset (i.e. canceled) and the equation can be rearranged as follows.

PAID=(dec(AID[0:4])+dec(BCB[0:N−1])*2^5+dec
(AID[5+N:8])*2^(5+N)+dec((BSSID[44+N:47]
XOR BSSID[40+N:43])*2^(5+N)) mod 2^9   [Equation 21]

Referring to Equation 21, the only factor that affects PAID[5:5+N−1] is dec(BCB[0:N−1]*2^5). Therefore, PAID [5:5+N−1] is equal to BCB[0:N−1].

(Case a-2) When N is 4

When N is 4, dec(BSSID[44:44+N−1] XOR BSSID[40: 40+N−1]) of Equation 19 is the same as dec(BSSID[44:47] XOR BSSID[40:43]) of Equation 14. Therefore, substituting the Equation 19 into the Equation 14 yields the following equation.

PAID=(dec(AID[0:4])+dec(BCB[0:N−1]))*2^5+dec
(AID[5+N:8])*2^(5+N))) mod 2^9   [Equation 22]

Referring to Equation 22, the only factor that affects PAID[5:5+N−1] is dec(BCB[0:N−1]*2^5). Therefore, PAID [5:5+N−1] is equal to BCB[0:N−1].

As described above, in all cases, the predetermined bits of the PAID, that is, PAID[5:5+N−1] have the same value as the partial BSS color value, that is, BCB[0:N−1].

FIG. 22 illustrates the third embodiment of a method of determining an intra-BSS frame and an inter-BSS frame according to the present invention. The intra-BSS frame and inter-BSS frame determination method shown in FIG. 22 may be used when the AID is assigned according to the fifth embodiment illustrated in FIGS. 20 and 21.

First, the terminal receives a wireless frame and extracts a group ID and PAID information from the received frame (S2210). If the received frame is a VHT PPDU, the RXVECTOR parameter of the frame includes the group ID and the PAID. Therefore, if the received frame is a VHT PPDU, the terminal extracts the group ID and the PAID information from the preamble of the VHT PPDU.

Next, the terminal checks which information the extracted group ID represents (S2220). More specifically, the terminal checks whether the extracted group ID information is equal to 0 or 63. As described above in the embodiment of FIG. 8, the group ID 0 may indicate that the frame is an uplink frame. Also, the group ID 63 may indicate that the frame is a downlink frame. That is, the terminal may identify whether the frame is an uplink frame or a downlink frame through the extracted group ID information.

If the extracted group ID information is equal to 0 (i.e., indicating an uplink frame), the terminal checks whether the PAID extracted from the frame matches specific bit value of the BSSID of the BSS with which the terminal is associated (S2230). In this case, the specific bit value of the BSSID may be BSSID[39:47]. As described above with reference to FIG. 8, since the PAID is set to BSSID[39:47] in the case of the uplink frame, the terminal may determine whether the frame is an intra-BSS frame or an inter-BSS frame according to whether the PAID of the received frame matches the BSSID[39:47] of the BSS with which the terminal is associated. If the PAID matches the BSSID[39:47], the terminal determines the received frame as an intra-BSS frame (S2232). However, if the PAID does not match the BSSID [39:47], the terminal determines the received frame as an inter-BSS frame (S2234).

Meanwhile, if the extracted group ID information is equal to 63 (i.e., indicating a downlink frame), the terminal checks whether the PAID information extracted from the frame matches the partial BSS color announced to the terminal (S2240). In this case, the PAID information indicates predetermined bit(s) of the PAID. In the embodiment of FIG. 22, the predetermined bit(s) of the PAID indicates PAID[5: 5+N−1]. Also, the partial BSS color announced to the terminal indicates the partial BSS color announced by the AP with which the terminal is associated. If the AID is assigned according to the fifth embodiment of the present invention, at least a portion of the K-bit value based on the BSSID is offset by the N-bit value based on the BSSID when the PAID is set. Thus, the predetermined bits (i.e., PAID[5: 5+N−1]) of the PAID represent the partial BSS color announced to the intended recipient of the frame. Therefore, the terminal may determine whether the corresponding frame is an intra-BSS frame or an inter-BSS frame according to whether the predetermined bits of the PAID of the received frame match the partial BSS color announced to the terminal. If the predetermined bits of the PAID match the partial BSS color announced to the terminal, the terminal determines the received frame as an intra-BSS frame (S2242). However, if the predetermined bits of the PAID do not match the partial BSS color announced to the terminal, the terminal determines the received frame as an inter-BSS frame (S2244).

According to an embodiment of the present invention, the intra-BSS frame and inter-BSS frame determination method when the extracted group ID information is equal to 63 may be performed only when a value N of the 'number of partial BSS color bits used for AID' field of the non-legacy element most recently received from the associated AP is not 0. According to another embodiment of the present invention, the intra-BSS frame and inter-BSS frame determination method when the extracted group ID information is equal to 63 may be performed only when the 'partial BSS color bits indication' filed of the non-legacy element most recently received from the associated AP is set to 1. As described above, when the 'partial BSS color bits indication' field is set to 1, the AID assignment rule in which partial BSS color bits are used is applied.

FIG. 23 illustrates a non-legacy element format according to yet another embodiment of the present invention. Among the fields of the non-legacy element in FIG. 23, duplicative description of parts which are the same as the field of the non-legacy element described in the above embodiments will be omitted.

The operation of HE STAs (i.e., non-legacy terminals) of an HE BSS may be controlled by the HT operation element, the VHT operation element, the HE operation element (i.e., non-legacy element), and the like. As described above, the non-legacy element may be included in a beacon frame, a probe request frame, a probe response frame, an association request frame, an association response frame, a reassociation request frame, a reassociation response frame, and the like. In addition, the non-legacy element may also be transmitted via a frame that contains the element alone. Referring to FIG. 23, the non-legacy element may include an 'element ID' field, a 'length' field, and an 'HE operation parameters' field. In addition, the 'HE operation parameters' field may include a 'BSS color' field and a 'partial BSS color length' field.

The 'BSS Color' field indicates the BSS color value. The BSS color represents a BSS color of a BSS operated by an AP transmitting the element. In addition, the BSS color may represent a BSS color of a BSS with which a STA transmitting the element is associated. The 'BSS color' field has a length of 6 bits and may represent a value of an unsigned integer. According to an embodiment, when the value of the 'BSS color' field is not 0, it may indicate a BSS color, and when the value of the 'BSS color' field is 0, it may indicate that the BSS color is not set to the corresponding BSS.

The 'partial BSS color length' field may include information related to the intra/inter-BSS frame determination using the PAID of the VHT PPDU. For example, the 'partial BSS color length' field may indicate the number N of bits of the partial BSS color used for the AID assignment. The 'partial BSS color length' field may perform the same function as the 'number of partial BSS color bits used for AID' field described above. The 'partial BSS color length' field may have a length of 3 bits, but the present invention is not limited thereto.

FIG. 24 illustrates the sixth embodiment of an AID assignment method according to the present invention. Referring to FIG. 24, the sixth embodiment of the AID assignment method according to the present invention can be expressed as Equation 23 below.

$$AID(8-N+1:8)=bin[(dec(BCB(0:N-1))-dec(BSSID(47-N+1:47) \text{ XOR } BSSID(43-N+1:43))) \mod 2^N,N] \quad \text{[Equation 23]}$$

Herein, N is 4.

According to the sixth embodiment of the present invention, bit(s) from bit 8−N+1 to bit 8 of the AID may be set by the rule of Equation 23. According to the embodiment of Equation 23, the predetermined N-bit(s) of the AID may be determined based on a value obtained by subtracting the BSSID information from the BCB information. More specifically, the predetermined N-bit(s) of the AID are determined by applying a modulo operation to the value obtained by subtracting the N-bit value based on the BSSID from the value (i.e., the partial BSS color value) of the least significant N-bit(s) of the BSS color. In this case, the predetermined N-bit(s) of the AID is bit(s) from bit 8−N+1 to bit 8 of the AID. The N-bit value based on the BSSID indicates the exclusive OR of the first predetermined N-bit(s) of the BSSID and the second predetermined N-bit(s) of the BSSID. In the embodiment of Equation 23, the first predetermined N-bit(s) may indicate bit(s) from bit 47−N+1 to bit 47 and the second predetermined N-bit(s) may indicate the bit(s) from 43−N+1 to bit 43.

As described above with reference to FIG. 11, in the PAID calculation process, the lower 5 bits of y are all set to 0 (i.e., '00000'). In this case, PAID[5:8] is set to a fixed value in the BSS when bits from bit 5 to bit 8 of the AID are set according to the rule of Equation 23. Therefore, when the AID is assigned according to the rule of Equation 23, ambiguity in PAID value determination can be prevented.

In addition, if the AID is assigned according to the rule of Equation 23, the K-bit value (i.e., y in FIG. 11) based on the BSSID is offset by the N-bit value based on the BSSID when the PAID is set according to the embodiment of Equation 1. Thus, the predetermined bits (i.e., PAID[8−N+1:8]) of the PAID represent the partial BSS color value announced to the intended recipient of the frame. Accordingly, when the received frame is a VHT PPDU (and the group ID extracted from the received frame is equal to 63), the terminal may perform the intra-BSS frame and inter-BSS frame determination by comparing the predetermined bits of the PAID extracted from the received frame with the partial BSS color announced to the terminal. In this case, the predetermined bits of the PAID are a value of predetermined 4 bits of the PAID, that is, a value of PAID[5:8]. If the predetermined bits of the PAID match the partial BSS color announced to the terminal, the terminal determines the received frame as an intra-BSS frame. However, if the predetermined bits of the PAID do not match the partial BSS color announced to the terminal, the terminal determines the received frame as an inter-BSS frame.

According to the embodiment of the present invention, since the predetermined bits of the PAID represent the partial BSS color value, the terminal receiving the frame may perform the intra-BSS frame and inter-BSS frame determination by using the PADI information without obtaining additional information or performing additional calculation.

FIG. 25 illustrates a non-legacy element format according to still another embodiment of the present invention. Among the fields of the non-legacy element in FIG. 25, duplicative description of parts which are the same as the field of the non-legacy element described in the above embodiments will be omitted.

Referring to FIG. 25, the non-legacy element may include an 'element ID' field, a 'length' field, and an 'HE operation parameters' field. In addition, the 'HE operation parameters' field may include a 'BSS color' field and a 'partial BSS color indication' field. According to an embodiment, the 'HE operation parameters' field of the non-legacy element may include a 6-bit 'BSS color' field and a 1-bit 'partial BSS color indication' field.

The 'BSS color' field indicates the BSS color value as described above with reference to FIG. 23. The 'partial BSS color bits indication' field indicates whether the corresponding BSS applies the AID assignment rule in which partial BSS color bits are used. If the field is set to 1, an N-bit (where N is 4) partial BSS color value is used for the AID assignment. However, if the field is set to 0, the partial BSS color is not used for the AID assignment. In addition, the 'partial BSS color bits indication' field may indicate whether the intra/inter-BSS frame determination method using the PAID information of the VHT PPDU is used. According to the embodiment of FIG. 24, the bit number N of the partial BSS color used for the AID assignment is fixed. Thus, the non-legacy element may indicate whether the partial BSS color is used for the AID assignment through the 1-bit 'partial BSS color bits indication' field.

Figures 26, 27:
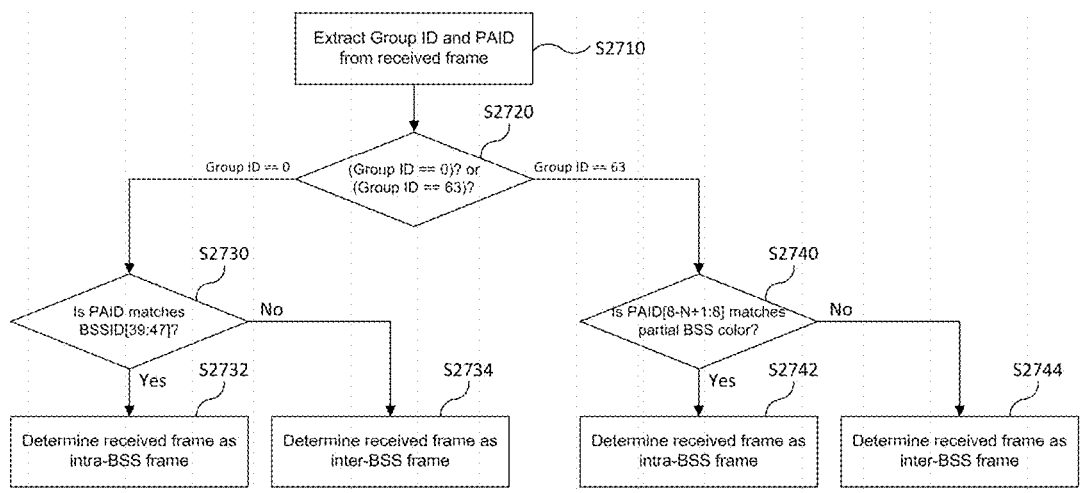
FIG. 26 illustrates the seventh embodiment of an AID assignment method according to the present invention.
FIG. 27 illustrates the fourth embodiment of a method of determining an intra-BSS frame and an inter-BSS frame according to the present invention.

FIG. 26 illustrates the seventh embodiment of an AID assignment method according to the present invention. FIG. 26(*a*) shows an AID assignment method when N is not 4, and FIG. 26(*a*) shows an AID assignment method when N is 4. Herein, N denotes the number of partial BSS color bits used for the AID assignment.

First, referring to FIG. 26(*a*), when N is not 4, the seventh embodiment of the AID assignment method according to the present invention can be expressed as Equation 24 below.

$$AID[5:8]=bin[(dec(BCB[0:N-1])*2^{4-N}+dec(A[0:3-N])-dec(BSSID[44:47] \text{ XOR } BSSID[40:43])) \mod 2^4,4] \quad \text{[Equation 24]}$$

Herein, A[0:3-N] is an arbitrary (3-N+1)-bit binary number.

Next, referring to FIG. 26(b), when N is 4, the seventh embodiment of the AID assignment method according to the present invention can be expressed as Equation 25 below.

AID[5:8]=bin[(dec(BCB[0:3])-dec(BSSID[44:47] XOR BSSID[40:43])) mod $2^4$,4]  [Equation 25]

Referring to Equations 24 and 25, bits from bit 5 to bit 8 of the AID may be set by the seventh embodiment of the AID assignment method according to the present invention. According to the seventh embodiment of the present invention, the bits from bit 5 to bit 8 of the AID may be determined based on a value obtained by subtracting the BSSID information from the value based on the BCB information. In this case, the BCB information indicates the partial BSS color, and the BSSID information indicates the N-bit value based on the BSSID. More specifically, the N-bit value based on the BSSID may be an exclusive OR of the value of bits from bit 44 to bit 47 of the BSSID and the value of bits from bit 40 to bit 43 of the BSSID.

If the AID is assigned according to the rules of Equation 24 and Equation 25, the K-bit value (i.e., y in FIG. 11) based on the BSSID is offset by the N-bit value based on the BSSID when the PAID is set according to the embodiment of Equation 1. Thus, the predetermined bits (i.e., PAID[8-N+1:8]) of the PAID represent the partial BSS color value announced to the intended recipient of the frame. Accordingly, when the received frame is a VHT PPDU (and the group ID extracted from the received frame is equal to 63), the terminal may perform the intra-BSS frame and inter-BSS frame determination by comparing the predetermined bits of the PAID extracted from the received frame with the partial BSS color announced to the terminal.

Hereinafter, the reason why the predetermined bits (i.e., PAID[8-N+1:8]) of the PAID represent the partial BSS color value (i.e., BCB[0:N-1]) when the seventh embodiment of the AID assignment method according to the present invention is used will be described in more detail. First, referring to Equation 1, PAID[5:8] is determined according to the following equation.

PAID[5:8]=(dec(AID[5:8])+dec(BSSID[44:47] XOR BSSID[40:43])) mod $2^4$  [Equation 26]

(Case A) when N is not 4

When N is not 4, AID[5:8] can be set by the rule of Equation 24. Referring to Equation 24, AID[5:8] is determined to be a variable value due to A[0:3-N]. The upper N-bit(s) of AID[5:8] are determined based on BCB[0:N-1] N] to represent a variable value.

(Case A-1) when (dec(BCB[0:N-1])*$2^{(4-N)}$+dec(A[0: 3-N])-dec(BSSID[44:47] XOR BSSID[40:43]))>=0

Substituting Equation 24 into Equation 26 yields the following equation.

PAID[5:8]= ((dec(BCB[0:N − 1]) ∗ $2^{\wedge}(4 − N)$ + dec(A[0:3 −  [Equation 27]

N]) − dec(BSSID[44:47]XORBSSID[40:43])) + dec(BSSID[44:47]XORBSSID[40:43]))mod$2^{\wedge}4$

= (dec(BCB[0:N − 1]) ∗ $2^{\wedge}(4 − N)$ + dec(A[0:3 − N]))mod$2^{\wedge}4$

= (dec(BCB[0:N − 1]) ∗ $2^{\wedge}(4 − N)$ + dec(A[0:3 −

N])

Referring to Equation 27, the only factor that affects PAID[8-N+1:8] is dec(BCB[0:N-1])*$2^{(4-N)}$. Therefore, PAID[8-N+1:8] is equal to BCB[0:N-1].

(Case A-2) when (dec(BCB[0:N-1])*$2^{(4-N)}$+dec(A[0: 3-N])-dec(BSSID[44:47] XOR BSSID[40:43]))<0

Substituting Equation 24 into Equation 26 yields the following equation.

PAID[5:8] = (($2^{\wedge}4$ + dec(BCB[0:N − 1]) ∗ $2^{\wedge}(4 − N)$ +  [Equation 28]

dec(A[0:3 − N]) − dec(BSSID[44:47]

XORBSSID[40:43])) + dec(BSSID[44:47]

XORBSSID[40:43]))mod$2^{\wedge}4$

= ($2^{\wedge}4$ + dec(BCB[0:N − 1]) ∗ $2^{\wedge}(4 − N)$ + dec(A[0:3 − N]))mod$2^{\wedge}4$

= dec(BCB[0:N − 1]) ∗ $2^{\wedge}(4 − N)$ + dec(A[0:3 − N])

Referring to Equation 28, the only factor that affects PAID[8-N+1:8] is dec(BCB[0:N-1])*$2^{(4-N)}$. Therefore, PAID[8-N+1:8] is equal to BCB[0:N-1].

(Case B) when N is 4

When N is 4, AID[5:8] can be set by the rule of Equation 25.

(Case B-1) when dec(BCB[0:3])-dec(BSSID[44:47] XOR BSSID[40:43])>=0

Substituting Equation 25 into Equation 26 yields the following equation.

PAID[5:8] = (dec(BCB[0:3]) − dec(BSSID[44:47]  [Equation 29]

XORBSSID[40:43]) + dec(BSSID[44:47]

XORBSSID[40:43]))mod$2^{\wedge}4$

= (dec(BCB[0:3]))mod$2^{\wedge}4$

= dec(BCB[0:3])

Referring to Equation 29, PAID[8-N+1:8] is equal to BCB[0:N-1] (where N is 4).

(Case B-2) when dec(BCB[0:3])-dec(BSSID[44:47] XOR BSSID[40:43])<0

Substituting Equation 25 into Equation 26 yields the following equation.

PAID[5:8] = ($2^{\wedge}4$ + dec(BCB[0:3]) − dec(BSSID[44:47]  [Equation 30]

XORBSSID[40:43]) + dec(BSSID[44:47]

XORBSSID[40:43]))mod$2^{\wedge}4$

= ($2^{\wedge}4$ + dec(BCB[0:3]))mod$2^{\wedge}4$

= dec(BCB[0:3])

Referring to Equation 30, PAID[8-N+1:8] is equal to BCB[0:N-1] (where N is 4).

As described above, in all cases, predetermined bits of the PAID, that is, PAID[8-N+1:8] have the same value as the partial BSS color value, i.e., BCB[0:N-1].

FIG. 27 illustrates the fourth embodiment of a method of determining an intra-BSS frame and an inter-BSS frame according to the present invention. The intra-BSS frame and inter-BSS frame determination method shown in FIG. 27 may be used when the AID is assigned according to the sixth embodiment described with reference to FIG. 24 or the seventh embodiment described with reference to FIG. 26.

First, the terminal receives a wireless frame and extracts group ID and PAID information from the received frame (S2710). If the received frame is a VHT PPDU, the RXVECTOR parameter of the frame includes the group ID and the PAID. Therefore, if the received frame is a VHT PPDU, the terminal extracts the group ID and the PAID information from the preamble of the VHT PPDU.

Next, the terminal checks which information the extracted group ID represents (S2720). More specifically, the terminal checks whether the extracted group ID information is equal to 0 or 63. As described above in the embodiment of FIG. 8, the group ID 0 may indicate that the frame is an uplink frame. Also, the group ID 63 may indicate that the frame is a downlink frame. That is, the terminal may identify whether the frame is an uplink frame or a downlink frame through the extracted group ID information.

If the extracted group ID information is equal to 0 (i.e., indicating an uplink frame), the terminal checks whether the PAID extracted from the frame matches specific bit value of the BSSID of the BSS with which the terminal is associated (S2730). In this case, the specific bit value of the BSSID may be BSSID[39:47]. As described above with reference to FIG. 8, since the PAID is set to BSSID[39:47] in the case of the uplink frame, the terminal may determine whether the frame is an intra-BSS frame or an inter-BSS frame according to whether the PAID of the received frame matches the BSSID[39:47] of the BSS with which the terminal is associated. If the PAID matches the BSSID[39:47], the terminal determines the received frame as an intra-BSS frame (S2732). However, if the PAID does not match the BSSID [39:47], the terminal determines the received frame as an inter-BSS frame (S2734).

Meanwhile, if the extracted group ID information is equal to 63 (i.e., indicating a downlink frame), the terminal checks whether the PAID information extracted from the frame matches the partial BSS color announced to the terminal (S2740). In this case, the PAID information indicates predetermined bit(s) of the PAID. In the embodiment of FIG. 27, the predetermined bit(s) of the PAID indicates PAID[8−N+1:8]. According to an embodiment of the present invention, N=4. Also, the partial BSS color announced to the terminal indicates the partial BSS color announced by the AP with which the terminal is associated. If the AID is assigned according to the sixth or seventh embodiment of the present invention, the K-bit value based on the BSSID is offset by the N-bit value based on the BSSID when the PAID is set. Thus, the predetermined bits (i.e., PAID[8−N+1:8]) of the PAID represent the partial BSS color announced to the intended recipient of the frame. Therefore, the terminal may determine whether the corresponding frame is an intra-BSS frame or an inter-BSS frame according to whether the predetermined bits of the PAID of the received frame match the partial BSS color announced to the terminal. If the predetermined bits of the PAID match the partial BSS color announced to the terminal, the terminal determines the received frame as an intra-BSS frame (S2742). However, if the predetermined bits of the PAID do not match the partial BSS color announced to the terminal, the terminal determines the received frame as an inter-BSS frame (S2744).

According to an embodiment of the present invention, the intra-BSS frame and inter-BSS frame determination method when the extracted group ID information is equal to 63 may be performed only when a value N of the 'number of partial BSS color bits used for AID' field of the non-legacy element most recently received from the associated AP is not 0. According to another embodiment of the present invention, the intra-BSS frame and inter-BSS frame determination method when the extracted group ID information is equal to 63 may be performed only when the 'partial BSS color bits indication' filed of the non-legacy element most recently received from the associated AP is set to 1. As described above, when the 'partial BSS color bits indication' field is set to 1, the AID assignment rule in which partial BSS color bits are used is applied.

Meanwhile, the AID assignment method according to the above-described embodiments may be applied only when allocating an AID of VHT STAs. The AID assignment candidate values are limited, and if the partial BSS color is used for the AID assignment, the number of values that can be assigned as an AID are further reduced. Therefore, according to the embodiment of the present invention, the AID assignment methods described above can be limitedly applied to the VHT STAs, thereby securing the margin of AID assignment for all STAs.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication terminal, the terminal comprising:
a processor; and
a communication unit,
wherein the processor is configured to:
receive a wireless frame through the communication unit,
when the received frame is a very high throughput (VHT) PHY protocol data unit (PPDU), extract information of a partial association ID (AID) and information of a group ID from a preamble of the VHT PPDU,
when the group ID of the VHT PPDU is equal to a predetermined value, check whether at least some information of the partial AID of the VHT PPDU matches a partial basic service set (BSS) color value of a BSS color announced to the terminal, and
determine whether the received frame is an intra-BSS frame or an inter-BSS frame according to whether the at least some information of the partial AID matches the partial BSS color value of the BSS color announced to the terminal.

2. The wireless communication terminal of claim 1, wherein the partial AID of the VHT PPDU is determined using an AID assigned to an intended recipient of the VHT PPDU and a K-bit value based on a BSSID of a BSS with which the recipient is associated,
wherein when the BSS with which the recipient is associated applies an AID assignment rule in which partial BSS color bits are used, predetermined N-bit(s) of the AID assigned to the recipient is determined by using a partial BSS color value of the BSS with which the recipient is associated and an N-bit value based on the BSSID of the BSS with which the recipient is associated, and
wherein the N is equal to K.

3. The wireless communication terminal of claim 2, wherein the predetermined N-bit(s) of the AID assigned to the recipient is determined based on a value obtained by subtracting the N-bit value from the partial BSS color value of the BSS with which the recipient is associated.

4. The wireless communication terminal of claim 3, wherein predetermined bit(s) of the partial AID of the VHT PPDU represent the partial BSS color value of the BSS with which the recipient is associated where the K-bit value is offset by the N-bit value.

5. The wireless communication terminal of claim 4, wherein the partial BSS color value is a value of the least significant N-bit(s) or the most significant N-bit(s) of the BSS color, and the N-bit value based on the BSSID is a value of exclusive OR of a first predetermined N-bit(s) of the BSSID and a second predetermined N-bit(s) of the BSSID.

6. The wireless communication terminal of claim 2, wherein the N is 4.

7. The wireless communication terminal of claim 2, wherein the AID assignment rule is as the following equation:

$$AID(8-N+1:8)=bin[(dec(BCB(0:N-1))-dec(BSSID(47-N+1:47) \text{ XOR } BSSID(43-N+1:43))) \bmod 2^N, N]$$

Herein, the BCB is a BSS color, the BSSID is a BSS identifier, and N=4.

8. The wireless communication terminal of claim 1, wherein the predetermined value of the group ID information indicates that the frame is a downlink frame.

9. A wireless communication method of a wireless communication terminal, the method comprising:
receiving a wireless frame through the communication unit;
when the received frame is a very high throughput (VHT) PHY protocol data unit (PPDU), extracting information of a partial association ID (AID) and information of a group ID from a preamble of the VHT PPDU;
when the group ID of the VHT PPDU is equal to a predetermined value, checking whether at least some information of the partial AID of the VHT PPDU matches a partial basic service set (BSS) color value of a BSS color announced to the terminal; and
determining whether the received frame is an intra-BSS frame or an inter-BSS frame according to whether the at least some information of the partial AID matches the partial BSS color value of the BSS color announced to the terminal.

10. The wireless communication method of claim 9, wherein the partial AID of the VHT PPDU is determined using an AID assigned to an intended recipient of the VHT PPDU and a K-bit value based on a BSSID of a BSS with which the recipient is associated,
wherein when the BSS with which the recipient is associated applies an AID assignment rule in which partial BSS color bits are used, predetermined N-bit(s) of the AID assigned to the recipient is determined by using a partial BSS color value of the BSS with which the recipient is associated and an N-bit value based on the BSSID of the BSS with which the recipient is associated, and wherein the N is equal to K.

11. The wireless communication method of claim 10, wherein the predetermined N-bit(s) of the AID assigned to the recipient is determined based on a value obtained by subtracting the N-bit value from the partial BSS color value of the BSS with which the recipient is associated.

12. The wireless communication method of claim 11, wherein predetermined bit(s) of the partial AID of the VHT PPDU represent the partial BSS color value of the BSS with which the recipient is associated where the K-bit value is offset by the N-bit value.

13. The wireless communication method of claim 12, wherein the partial BSS color value is a value of the least significant N-bit(s) or the most significant N-bit(s) of the BSS color, and the N-bit value based on the BSSID is a value of exclusive OR of a first predetermined N-bit(s) of the BSSID and a second predetermined N-bit(s) of the BSSID.

14. The wireless communication method of claim 10, wherein the N is 4.

15. The wireless communication method of claim 10, wherein the AID assignment rule is determined as the following equation:

$$AID(8-N+1:8)=bin[(dec(BCB(0:N-1))-dec(BSSID(47-N+1:47) \text{ XOR } BSSID(43-N+1:43))) \bmod 2^N, N]$$

Herein, the BCB is a BSS color, the BSSID is a BSS identifier, and N=4.

16. The wireless communication method of claim 9, wherein the predetermined value of the group ID information indicates that the frame is a downlink frame.

* * * * *